United States Patent
Knas et al.

(10) Patent No.: US 10,733,275 B1
(45) Date of Patent: Aug. 4, 2020

(54) ACCESS CONTROL THROUGH HEAD IMAGING AND BIOMETRIC AUTHENTICATION

(71) Applicant: MASSACHUSETTS MUTUAL LIFE INSURANCE COMPANY, Springfield, MA (US)

(72) Inventors: Michal Knas, Monson, MA (US); Jiby John, Suffield, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 396 days.

(21) Appl. No.: 15/476,519

(22) Filed: Mar. 31, 2017

Related U.S. Application Data

(60) Provisional application No. 62/317,132, filed on Apr. 1, 2016.

(51) Int. Cl.
  *G06F 21/32* (2013.01)
  *G06K 9/00* (2006.01)

(52) U.S. Cl.
  CPC ......... *G06F 21/32* (2013.01); *G06K 9/00255* (2013.01); *G06K 9/00288* (2013.01);
  (Continued)

(58) Field of Classification Search
  CPC ............... G06F 21/32; G06K 9/00221; G06K 9/00255; G06K 9/0012; G06K 9/00241; G06K 9/00248; G06K 9/00261; G06K 9/00281; G06K 9/00308; G06K 9/00288; G06K 9/00597; G06K 9/00604;
  (Continued)

(56) References Cited

U.S. PATENT DOCUMENTS

| | | | | |
|---|---|---|---|---|
| 4,595,990 A | * | 6/1986 | Garwin | A61B 3/113 708/141 |
| 4,859,050 A | * | 8/1989 | Borah | A61B 3/113 351/210 |
| 5,481,622 A | | 1/1996 | Gerhardt et al. | |
| 6,637,883 B1 | * | 10/2003 | Tengshe | A61B 3/113 351/210 |

(Continued)

OTHER PUBLICATIONS

Weaver et al., Gaze-Based Password Authentication through Automatic Clustering of Gaze Points, IEEE (Year: 2011).*

(Continued)

*Primary Examiner* — Noura Zoubair
*Assistant Examiner* — Mahabub S Ahmed
(74) *Attorney, Agent, or Firm* — Foley & Lardner LLP

(57) ABSTRACT

An authentication process is activated by a processor receiving an access request for user access to a user device. One or more biometric sensor module captures imaging data or other sensor data within a field of view encompassing the head of the user, or encompassing a head region including the head of the user. The processor carries out biometric recognition methods on the captured imaging data. Biometric recognition methods may include head-limb gesture recognition (including hand-to-face, and limb-near-head, gestures); head recognition; ocular recognition; facial recognition; and combinations of these methods. Upon successful match of captured sensor data with one or more user credential records stored for an authorized user of the user device, the processor authorizes the access request, providing access to the operating environment of the user device on start-up, or to one or more of a system setting, an application program, a data, and a hardware resource.

18 Claims, 10 Drawing Sheets

(52) U.S. Cl.
CPC ..... *G06K 9/00604* (2013.01); *G06K 9/00617*
(2013.01); *G06K 9/00892* (2013.01)

(58) Field of Classification Search
CPC ........... G06K 9/00617; G06K 9/00885; G06K
9/00892; G06K 9/00919
USPC .................................................... 726/18–25
See application file for complete search history.

(56) References Cited

U.S. PATENT DOCUMENTS

| | | | | |
|---|---|---|---|---|
| 7,986,816 B1* | 7/2011 | Hoanca | G06K 9/00892 | 382/115 |
| 8,457,367 B1* | 6/2013 | Sipe | G06K 9/00221 | 382/118 |
| 8,494,961 B1* | 7/2013 | Lucas | G06Q 20/1085 | 705/35 |
| 8,538,072 B2* | 9/2013 | Kelly | G06F 21/316 | 382/103 |
| 8,594,374 B1* | 11/2013 | Bozarth | G06F 21/36 | 382/103 |
| 8,856,541 B1* | 10/2014 | Chaudhury | G06F 21/32 | 382/115 |
| 8,982,160 B2* | 3/2015 | Yee | G06F 3/013 | 345/619 |
| 9,129,154 B2* | 9/2015 | Kim | G06K 9/00355 | |
| 9,135,508 B2* | 9/2015 | Vaught | G06K 9/00617 | |
| 9,159,203 B2 | 10/2015 | Priesterjahn et al. | | |
| 9,202,105 B1* | 12/2015 | Wang | G06Q 20/4014 | |
| 9,280,652 B1* | 3/2016 | Bozarth | G06F 21/36 | |
| 9,619,697 B2* | 4/2017 | Pabbichetty | G06K 9/00288 | |
| 9,953,149 B2* | 4/2018 | Tussy | G06Q 20/40145 | |
| 9,977,882 B2* | 5/2018 | Scavezze | G06F 21/31 | |
| 2003/0091215 A1* | 5/2003 | Lauper | G07C 9/37 | 382/117 |
| 2003/0152252 A1* | 8/2003 | Kondo | G06K 9/00597 | 382/117 |
| 2004/0151347 A1* | 8/2004 | Wisniewski | G06K 9/00221 | 382/115 |
| 2004/0151348 A1* | 8/2004 | Ono | G07C 9/00158 | 382/115 |
| 2004/0151351 A1* | 8/2004 | Ito | G06K 9/00288 | 382/118 |
| 2005/0012854 A1* | 1/2005 | Silverbrook | B41J 2/01 | 348/376 |
| 2005/0060554 A1* | 3/2005 | O'Donoghue | G06F 21/36 | 713/183 |
| 2006/0109238 A1* | 5/2006 | Lau | G06F 3/013 | 345/156 |
| 2006/0120707 A1* | 6/2006 | Kusakari | A61B 5/1171 | 396/18 |
| 2007/0104369 A1* | 5/2007 | Weatherhead | H04H 60/48 | 382/181 |
| 2008/0253622 A1* | 10/2008 | Tosa | G06K 9/00604 | 382/117 |
| 2009/0153366 A1* | 6/2009 | Im | G06F 3/017 | 341/20 |
| 2009/0185723 A1* | 7/2009 | Kurtz | G06K 9/00288 | 382/118 |
| 2009/0201372 A1 | 8/2009 | O'Doherty et al. | | |
| 2009/0320123 A1 | 12/2009 | Yu et al. | | |
| 2010/0007665 A1* | 1/2010 | Smith | G06T 13/40 | 345/473 |
| 2010/0299530 A1* | 11/2010 | Bell | G06F 21/32 | 713/186 |
| 2011/0058712 A1* | 3/2011 | Sanchez Ramos | A61B 5/1171 | 382/117 |
| 2011/0170065 A1* | 7/2011 | Sugio | A61B 5/0496 | 351/209 |
| 2011/0182472 A1* | 7/2011 | Hansen | A61B 3/113 | 382/103 |
| 2012/0154536 A1* | 6/2012 | Stoker | H04N 5/2258 | 348/46 |
| 2012/0199653 A1* | 8/2012 | Wenzel | G07C 9/00087 | 235/382 |
| 2012/0236107 A1* | 9/2012 | Rosenberg | G02B 30/00 | 348/14.08 |
| 2012/0243729 A1* | 9/2012 | Pasquero | G06F 3/013 | 382/103 |
| 2012/0256967 A1* | 10/2012 | Baldwin | G06F 3/013 | 345/684 |
| 2013/0030571 A1* | 1/2013 | Ruiz Morales | G06F 3/0482 | 700/259 |
| 2013/0044055 A1* | 2/2013 | Karmarkar | G06F 3/013 | 345/158 |
| 2013/0167212 A1 | 6/2013 | Azar et al. | | |
| 2013/0223696 A1* | 8/2013 | Azar | G06K 9/00892 | 382/118 |
| 2013/0227651 A1* | 8/2013 | Schultz | G06F 21/32 | 726/4 |
| 2013/0246264 A1 | 9/2013 | Lucas et al. | | |
| 2013/0342672 A1* | 12/2013 | Gray | G06F 3/013 | 348/78 |
| 2013/0347087 A1 | 12/2013 | Smith | | |
| 2014/0016837 A1* | 1/2014 | Nechyba | G06K 9/00906 | 382/118 |
| 2014/0050371 A1* | 2/2014 | Inkumsah | G06F 21/32 | 382/117 |
| 2014/0059673 A1* | 2/2014 | Azar | G06F 21/32 | 726/19 |
| 2014/0126782 A1* | 5/2014 | Takai | G06K 9/0061 | 382/116 |
| 2014/0247208 A1* | 9/2014 | Henderek | G06F 3/0487 | 345/156 |
| 2014/0310803 A1* | 10/2014 | Irie | G06F 21/32 | 726/19 |
| 2014/0337221 A1* | 11/2014 | Hoyos | H04L 63/0861 | 705/44 |
| 2015/0091793 A1* | 4/2015 | Lee | G06F 3/017 | 345/156 |
| 2015/0130714 A1* | 5/2015 | Onuki | G06K 9/00597 | 345/157 |
| 2015/0131850 A1* | 5/2015 | Qvarfordt | G06K 9/00617 | 382/103 |
| 2015/0135309 A1* | 5/2015 | Karmarkar | G06F 16/532 | 726/19 |
| 2015/0169862 A1 | 6/2015 | Smith | | |
| 2015/0186708 A1 | 7/2015 | Katz | | |
| 2015/0199111 A1* | 7/2015 | Okada | G06F 3/04817 | 715/835 |
| 2015/0241967 A1* | 8/2015 | Saripalle | G06F 3/013 | 382/195 |
| 2015/0262010 A1* | 9/2015 | Kuldkepp | G06K 9/00604 | 382/103 |
| 2015/0262150 A1 | 9/2015 | Morgan | | |
| 2015/0294283 A1 | 10/2015 | Siemasko | | |
| 2015/0302252 A1* | 10/2015 | Herrera | G06K 9/00617 | 382/117 |
| 2015/0309566 A1* | 10/2015 | Hampiholi | G06F 3/013 | 345/156 |
| 2015/0310259 A1* | 10/2015 | Lau | G07C 9/00 | 382/118 |
| 2015/0324568 A1* | 11/2015 | Publicover | G06F 3/017 | 726/19 |
| 2015/0339527 A1* | 11/2015 | Plummer | G06K 9/00845 | 348/78 |
| 2015/0347734 A1 | 12/2015 | Beigi | | |
| 2016/0004303 A1* | 1/2016 | Arar | G06F 3/013 | 345/156 |
| 2016/0062456 A1* | 3/2016 | Wang | G06F 21/32 | 382/117 |
| 2016/0063303 A1* | 3/2016 | Cheung | A61B 3/113 | 382/117 |
| 2016/0071111 A1* | 3/2016 | Wang | G06Q 20/4014 | 705/44 |
| 2016/0085949 A1* | 3/2016 | Peterson | G06F 21/32 | 726/19 |
| 2016/0112414 A1* | 4/2016 | Tsou | H04L 63/0861 | 726/7 |

(56) References Cited

U.S. PATENT DOCUMENTS

| | | | | |
|---|---|---|---|---|
| 2016/0133170 | A1* | 5/2016 | Fateh | G06F 3/147 |
| | | | | 345/428 |
| 2016/0307038 | A1* | 10/2016 | Skogo | G06K 9/00604 |
| 2016/0335483 | A1* | 11/2016 | Pfursich | G06K 9/00268 |
| 2016/0342206 | A1* | 11/2016 | Shazly | A61B 5/1114 |
| 2016/0342782 | A1* | 11/2016 | Mullins | G06F 21/32 |
| 2017/0076145 | A1* | 3/2017 | Gottemukkula | G06K 9/4642 |
| 2017/0084083 | A1* | 3/2017 | Wilson | G06T 19/006 |
| 2017/0140222 | A1* | 5/2017 | Zhou | G06F 21/32 |
| 2017/0154177 | A1* | 6/2017 | Tsou | G06F 21/32 |
| 2017/0180988 | A1* | 6/2017 | Kim | A61B 5/6887 |
| 2017/0185760 | A1* | 6/2017 | Wilder | G06F 21/36 |
| 2017/0186138 | A1* | 6/2017 | Raducan | G06K 9/00597 |
| 2017/0193723 | A1* | 7/2017 | Park | E05B 47/00 |
| 2017/0212583 | A1* | 7/2017 | Krasadakis | G06F 3/013 |
| 2017/0228018 | A1* | 8/2017 | Schaeferjohann | G06T 7/11 |
| 2017/0242481 | A1* | 8/2017 | Lu | G06F 3/013 |
| 2017/0243063 | A1* | 8/2017 | Kaneko | G06F 21/31 |
| 2017/0344111 | A1* | 11/2017 | Kim | G06F 3/013 |
| 2018/0018514 | A1* | 1/2018 | Azam | G06F 21/36 |
| 2018/0121724 | A1* | 5/2018 | Ovsiannikov | G06K 9/00617 |
| 2018/0189550 | A1* | 7/2018 | McCombe | G06K 9/00288 |
| 2018/0218371 | A1* | 8/2018 | Wang | G06Q 20/4014 |

OTHER PUBLICATIONS

Luca et al., Look into my Eyes! Can you guess my Password?, Symposium on Usable Privacy and Security (SOUPS) 2009, Jul. 15-17, 2009, Mountain View, CA USA (Year: 2009).*

M. Mahmoud et al., "Automatic analysis of naturalistic hand-over-face gestures", ACM Transactions on Interactive Intelligent Systems, vol. 6 Issue 2, Aug. 2016, 17 pages.

Y. Sun et al., "Facial Expression Recognition Based on 3D Dynamic Range Model Sequences", conference paper at European Conference on Computer Vision, Springer, Berlin, Heidelberg copyright 2008, 14 pages.

H. Gunes et al., "A Bimodal Face and Body Gesture Database for Automatic Analysis of Human Nonverbal Affective Behavior", conference paper at 18th International Conference on Pattern Recognition (ICPR'06), Aug. 2006, 5 pages.

S. Mitra, "Gesture Recognition: A Survey", IEEE Transactions on Systems, Man, and Cybernetics, Part C (Applications and Reviews), vol. 37, Issue: 3, May 2007, 14 pages.

M. Mahmoud et al., "Interpreting hand-over-face gestures", Affective Computing and Intelligent Interaction. Lecture Notes in Computer Science, vol. 6975., Springer, Berlin, Heidelberg, 2011, 8 pages.

M. Turk et al., "Eigenfaces for Recognition", Journal of Cognitive Neuroscience, vol. 3, No. 1, Winter 1991, 16 pages.

Z. Zhang, "Microsoft Kinect Sensor and Its Effect", IEEE MultiMedia, vol. 19, Issue 2, published Apr. 27, 2012, 7 pages.

http://www.recode.net/2016/3/14/11586942/amazon-wants-the-patent-for-pay-by-selfie, J. Del Rey, "Amazon Wants the Patent for Pay-By-Selfie", Mar. 14, 2016, 2 pages.

D. Heylen, "Head Gestures, Gaze and the Principles of Conversational Structure", International Journal of Humanoid Robotics, vol. 3, No. 3, published Aug. 19, 2006, 27 pages.

* cited by examiner

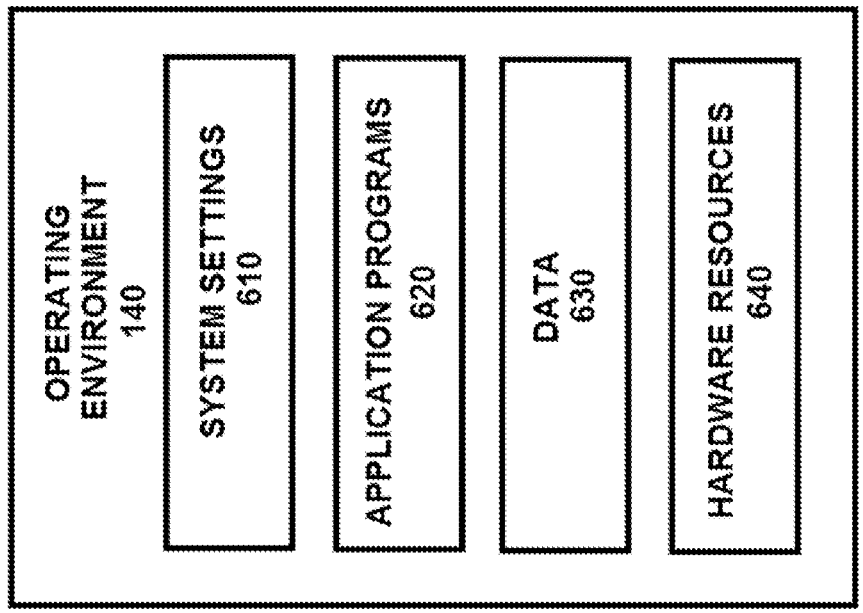
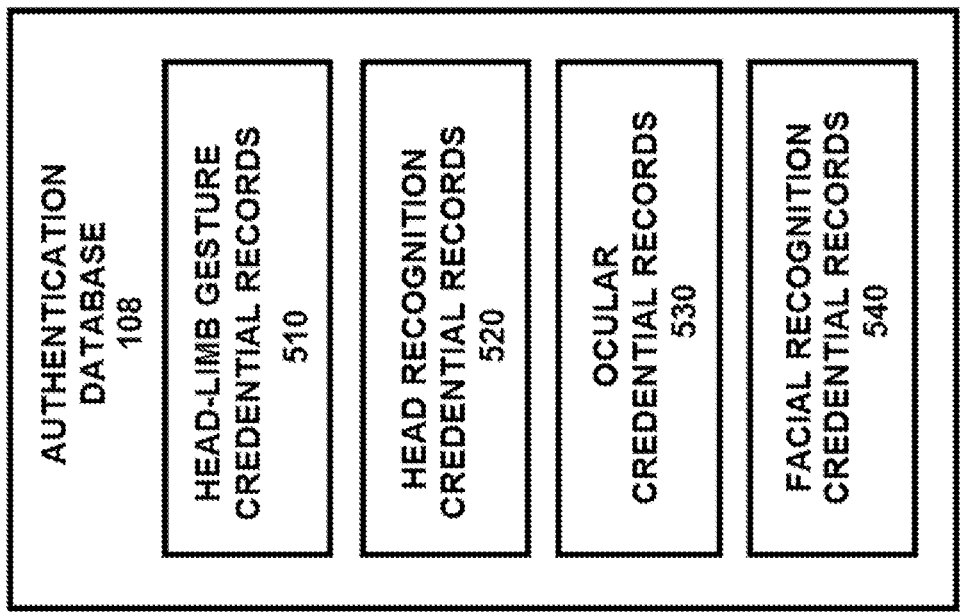

ACCESS CONTROL THROUGH HEAD IMAGING AND BIOMETRIC AUTHENTICATION

CROSS-REFERENCE TO RELATED APPLICATION

The present application claims benefit of U.S. Provisional Application No. 62/317,132, filed Apr. 1, 2016, entitled ACCESS CONTROL THROUGH HEAD IMAGING AND BIOMETRIC AUTHENTICATION, the entire contents of which are hereby incorporated by reference.

TECHNICAL FIELD

The present disclosure relates generally to systems and methods for authentication of individuals requesting access to user computing devices, and more particularly to authentication through head imaging and biometric authentication.

BACKGROUND

Many electronic devices such as personal computers, and mobile devices including mobile phones and tablet devices, use some form of authentication. "Identity management" poses the challenge of authentication—validating that an individual is who he says he is. Many applications require an authentication factor in the form of something the person knows, typically a password that must be input into the device to gain access. Typically, individuals are associated with usernames and passwords in order to gain access to computer systems. This has traditionally meant remembering and entering unique user names and passwords for the computer, secured applications and websites. In systems requiring additional security control such as online banking, individuals have been required to use "two factor authentications." This requires multiple types of identification such as a password plus a PIN or token. Keeping track of numerous passwords and constantly entering them has become inconvenient at best, and unmanageable for many.

A password is most often typed onto a keyboard or other interface which then allows the user to gain partial or full access to the utility of the device and/or network. A problem with using passwords is that they are time consuming and inconvenient to enter. Users often use informal passwords or share their password with others, compromising system security. These practices diminish the password's value and make it difficult to have an accurate auditing of access. Moreover, passwords can be difficult to administer when forgotten or misplaced.

It also is known to use biometric authentication to gain access to electronic devices. Biometric authentication using facial recognition is often used. Other biometric authentication techniques include, for example, voice recognition, fingerprints, palm print, hand geometry, iris recognition, retinal scan, palm print, and DNA. Still other techniques use a gesture, such as gestures associated with a device's display. Examples of gesture recognition technique include the user touching a device's touch screen, and movements that are recognized by the device.

While various applications using biometric authentication, and applications using authentication via gestures, are separately known in the art, there is a need for a system and method that combines these techniques in providing robust security. Additionally, there is a need for a system and method that combines these techniques so as to provide flexible, user-friendly access to electronic devices.

SUMMARY

Disclosed herein are access control systems and methods for authenticating users requesting access to an operating environment of a user device. According to an embodiment, an authentication process is activated by a processor receiving an access request by a user for access to an operating environment of the user device on start-up, or to one or more of a system setting, an application program, a data, and a hardware resource in the operating environment of the user device. One or more sensor module captures imaging data or other sensor data within a field of view encompassing the head of the user, or encompassing a head region including the head of the user. The processor carries out biometric recognition techniques on the captured imaging data. Upon successfully matching the imaging data with one or more user credential records stored for an authorized user of the user device, the processor authorizes the access request, and provides the requested access by the user to the operating environment of the user device on start-up, or to one or more resource in the operating environment of the user device, including a system setting, an application program, a data, and a hardware resource.

In an embodiment, a head-limb sensor module captures imaging data within a field of view encompassing a head region including the head of the user. The processor compares the imaging data with head-limb gesture credential records stored by the processor for one or more authorized user, and authorizes the access request in the event of a successful match. In an embodiment, prior to capturing the imaging data, an output device displays a head-limb gesture cue that can indicate the timing or selection of an appropriate head-limb gesture.

In an embodiment, a head-limb gesture credential record is representative of one or more of a hand-to-face gesture and a limb-near-head gesture. In an embodiment, the head-limb gesture credential record is a hand-to-face gesture representative of one or more of holding a facial feature, touching a facial feature, stroking a facial feature, tapping a facial feature, posing open hand to face, posing closed hand to face, posing both hands to face, moving open hand to face, moving closed hand to face, moving both hands to face, and leaning on hand. In an embodiment, the head-limb gesture credential record is a limb-near-head gesture representative of one or more of waving an arm, raising an arm, raising both arms, arms crossed behind head, hands on top of head, hands raised over head, open hand near head, closed hand near head, and hands pressed together near head.

In another embodiment, a head sensor module captures imaging data within a field of view encompassing the head of the user. The processor analyzes the imaging data to generate head recognition data representative of one or more of a position of the user's head, a movement of the user's head, and features of the user's head. In an embodiment, the processor compares the head recognition data with a head recognition credential record stored by the processor for an authorized user, and authorizes the access request in the event of a successful match.

In another embodiment, an ocular sensor module captures ocular recognition data for the user. The processor compares the ocular recognition data with an ocular credential record stored by the processor for an authorized user, and authorizes the access request in the event of a successful match. In an embodiment, user authentication via ocular recognition data is combined with user authentication via head recognition data. In this embodiment, the processor may analyze whether a direction of gaze indicated by the ocular recognition data corresponds to a head position or movement indicated by the head recognition data.

In another embodiment, the comparison of captured imaging data with one or more user credential records stored by the processor represents a knowledge authentication factor, in which the appropriate user credential record is known only by the user. Examples of authentication factors incorporating secret biometric knowledge include a secret head position or motion, a secret head-limb gesture, and a secret gaze direction.

In an embodiment, a processor-based method comprises receiving, by a processor in operative communication with a user device, an access request, wherein the access request comprises a requested access to an operating environment of the user device on power-up; capturing, by an head sensor module of the user device in response to the receiving the access request, first imaging data within a first field of view encompassing a head of a user of the user device, wherein the head sensor module is in operative communication with the processor; transmitting, by the user device, the first imaging data to the processor; generating and displaying, by an output device of the user device in operative communication with the processor, a head-limb gesture cue received from the processor in response to the first imaging data, wherein the head-limb gesture cue instructs the user to execute one or more gesture selected from hand-to-face gestures and limb-near-head gestures; capturing, by a head-limb sensor module of the user device, second imaging data within a second field of view comprising a head region encompassing the head of the user and regions proximate the head of the user, following the displaying the head-limb gesture cue; transmitting, by the user device, the second imaging data to the processor; comparing, by the processor, the first imaging data with a head recognition credential record stored by the processor; comparing, by the processor, the second imaging data with a head-limb gesture credential record stored by the processor, wherein the head-limb gesture credential record comprises static or dynamic image data representative of the one or more gesture selected from hand-to-face gestures and limb-near-head gestures; and in the event the first imaging data matches the head recognition credential record stored by the processor and the second imaging data matches the head-limb gesture credential record stored by the processor, authorizing, by the processor, the access request; and providing, by the user device, the requested access to the operating environment of the user device on power-up.

In an embodiment, a system comprises a head sensor module of a user device for capturing first imaging data within a first field of view encompassing a head of a user of the user device, wherein the head sensor module is in operative communication with a processor; a head-limb sensor module of the user device for capturing second imaging data within a second field of view comprising a head region encompassing the head of the user and regions proximate the head of the user; an output device of the user device; an authentication database hosted by the processor comprising non-transitory machine-readable memory, the authentication database configured to store a head recognition credential record and a head-limb gesture credential record; and the processor, configured to execute an authentication module, wherein the processor in communication with the non-transitory machine-readable memory and the authentication module executes a set of instructions instructing the processor to: receive an access request, wherein the access request comprises a requested access to an operating environment of the user device on power-up; receive from the head sensor module the first imaging data within the first field of view encompassing the head of the user of the user device; generate head-limb gesture cue data for display by the output device in response to the receiving the first imaging data, wherein the head-limb gesture cue data instructs the user to execute one or more gesture selected from hand-to-face gestures and limb-near-head gestures; receive from the head-limb sensor module the second imaging data within the second field of view comprising the head region encompassing the head of the user and regions proximate the head of the user, following the display of the head-limb gesture cue data; compare the first imaging data with the head recognition credential record stored by the authentication database; compare the second imaging data with the head-limb gesture credential record stored by the authentication database, wherein the head-limb gesture credential record comprises static or dynamic image data representative of the one or more gesture selected from hand-to-face gestures and limb-near-head gestures; and in the event the first imaging data matches the head recognition credential record stored by the authentication database and the second imaging data matches the head-limb gesture credential record stored by the authentication database, authorize the access request and provide the requested access to the operating environment of the user device on power-up.

In an embodiment, a processor-based method comprises receiving, by a processor in operative communication with a user device, an access request, wherein the access request comprises a requested access to an operating environment of the user device on power-up; capturing, by a head sensor module of the user device in response to the receiving the access request, imaging data within a field of view encompassing a head of a user of the user device, wherein the head sensor module is in operative communication with the processor; transmitting, by the user device, the imaging data to the processor; displaying, by an output device of the user device in operative communication with the processor, a visual display including a plurality of partitions, wherein the visual display includes an ocular cue received from the processor in response to the imaging data, the ocular cue including an instruction directing the user's gaze to a point of regard within a given partition of the plurality of partitions; capturing, by an ocular sensor module of the user device in communication with the processor, ocular recognition data for the user, following the displaying the ocular cue; transmitting, by the user device, the ocular recognition data to the processor; comparing, by the processor, the imaging data with a head recognition credential record stored by the processor; comparing, by the processor, the ocular recognition data with an ocular credential record stored by the processor, wherein the ocular recognition data matches the ocular credential record stored by the processor if the ocular recognition data is representative of the directing the user's gaze to the point of regard within the given partition; and in the event the imaging data matches the head recognition credential record stored by the processor and the ocular recognition data matches the ocular credential record stored by the processor, authorizing, by the processor, the access request; and providing, by the user device, the requested access to the operating environment of the user device on power-up.

In an embodiment, a processor-based method comprises receiving, by a processor in operative communication with a user device, an access request, wherein the access request comprises a requested access to an operating environment of the user device on power-up; displaying, by an output device of the user device in operative communication with the processor in response to the receiving the access request, a visual display including a plurality of partitions, wherein the visual display includes a head recognition cue received from the processor, the head recognition cue including an instruction to position or move a head of a user of the user device to face a given partition of the plurality of partitions; capturing, by a head sensor module of the user device, imaging data within a field of view encompassing the head of the user, wherein the head sensor module is in operative communication with the processor; transmitting, by the user device, the imaging data to the processor; capturing, by an ocular sensor module of the user device in communication with the processor, ocular recognition data for the user; transmitting, by the user device, the ocular recognition data to the processor; comparing, by the processor, the imaging data with a head recognition credential record stored by the processor, wherein the imaging data matches the head recognition credential record stored by the processor in the event the imaging data is representative of the position or movement of the head of the user to face the given partition of the plurality of partitions; comparing, by the processor, the ocular recognition data with an ocular credential record stored by the processor; and in the event the imaging data matches the head recognition credential record stored by the processor and the ocular recognition data matches the ocular credential record stored by the processor, authorizing, by the processor, the access request; and providing, by the user device, the requested access to the operating environment of the user device on power-up.

In an embodiment, a system, comprises a head sensor module of a user device for capturing imaging data within a field of view encompassing a head of a user of the user device, wherein the head sensor module is in operative communication with a processor; an ocular sensor module of the user device for capturing ocular recognition data of the user, wherein the ocular sensor module is in operative communication with the processor; an output device of the user device; an authentication database hosted by the processor comprising non-transitory machine-readable memory, the authentication database configured to store a head recognition credential record and an ocular credential record; and the processor, configured to execute an authentication module, wherein the processor in communication with the non-transitory machine-readable memory and the authentication module executes a set of instructions instructing the processor to: receive an access request, wherein the access request comprises a requested access to an operating environment of the user device on power-up; generate a visual display for display by the output device in response to the receiving the access request, wherein the visual display includes a plurality of partitions, and further includes a head recognition cue including an instruction to position or move the head of the user to face a given partition of the plurality of partitions; receive from the head sensor module the imaging data within the field of view encompassing the head of the user of the user device; receive from the ocular sensor module the ocular recognition data of the user; compare the imaging data with the head recognition credential record stored by the authentication database, wherein the imaging data matches the head recognition credential record in the event the imaging data is representative of the position or movement of the head of the user to face the given partition of the plurality of partitions; compare the ocular recognition data with the ocular credential record stored by the authentication database; and in the event the imaging data matches the head recognition credential record stored by the authentication database and the ocular recognition data matches the ocular credential record stored by the authentication database, authorize the access request and provide the requested access to the operating environment of the user device on power-up.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

FIG. 5 is a block diagram illustrating component databases included in an authentication database, according to the embodiment of FIG. 1;

FIG. 6 is a block diagram illustrating computing resources included in an operating environment of a user device, according to the embodiment of FIG. 1;

DETAILED DESCRIPTION

Figure 1:
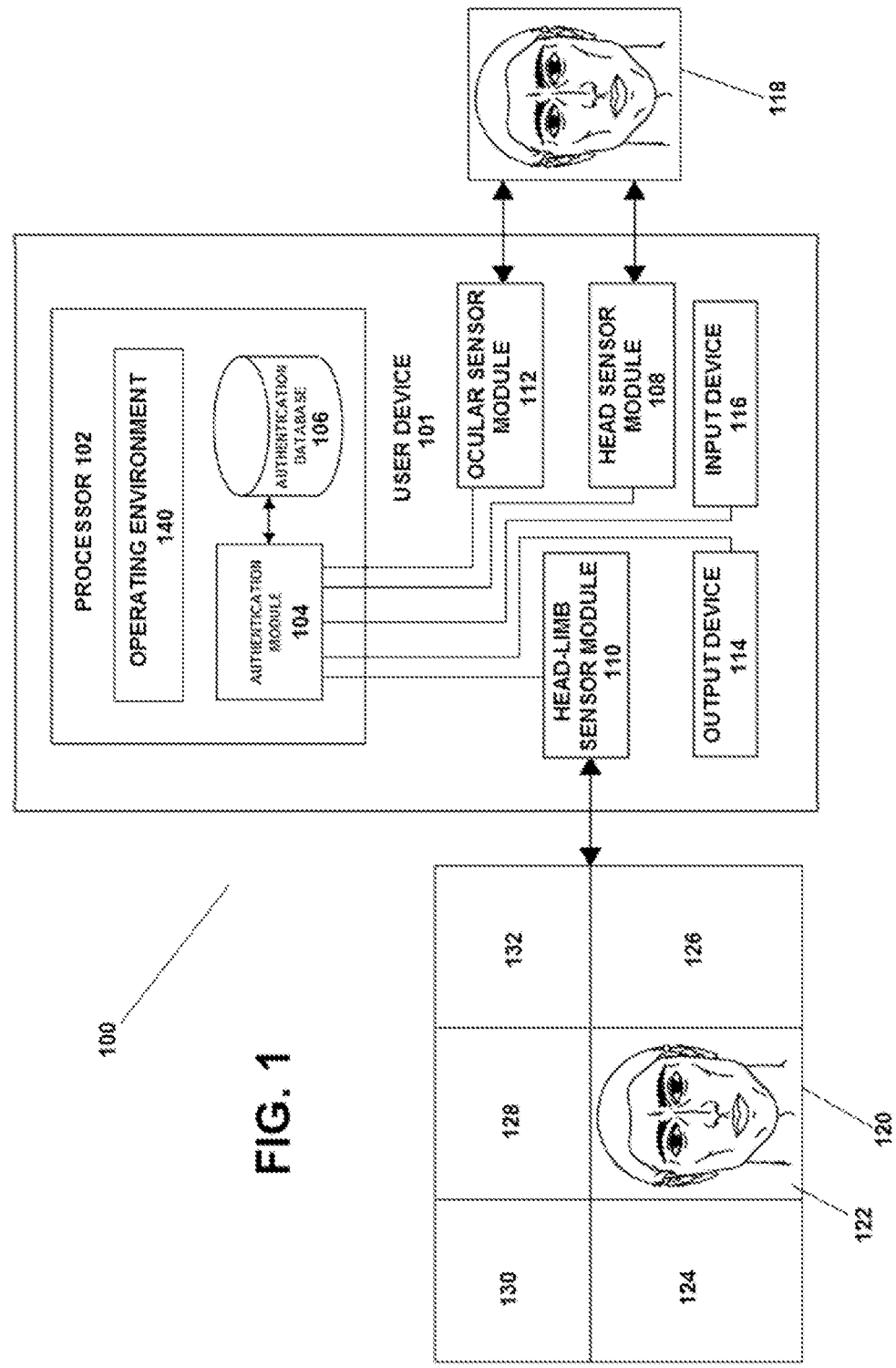
FIG. 1 is a block diagram illustrating an access control system for authenticating user access to a user device, according to an exemplary embodiment.

The present disclosure is here described in detail with reference to embodiments illustrated in the drawings, which form a part hereof. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

System Components and Architecture

FIG. 1 is a block diagram illustrating a system 100 for authenticating user access to the operating environment 140 of a user device 101 (also herein called user authentication system 100), according to an exemplary embodiment. Upon a processor 102 receiving an access request, one or more biometric sensor module captures imaging data within a field of view of an imaging sensor. In particular, a head sensor module 108 and/or an ocular sensor module 112 are configured to capture imaging data within a field of view 118 encompassing the head of the user. A head-limb sensor module 110 is configured to capture imaging data within a field of view 120 encompassing a head region including the head of the user.

The processor 102 carries out biometric recognition and gesture recognition techniques on captured imaging data and other sensor data. System 100 uses various forms of biometric recognition, i.e., recognition of metrics related to human characteristics, and provides robust, user friendly user authentication techniques. At the same time, system 100 uses various forms of gesture recognition, i.e., recognition of expressive, meaningful physical movements and/or posed configurations of the fingers, hands, arms, head, or face. In the present system and method, an authorized user executes gestures with the intent of interacting with system 100 to authenticate the user, typically via comparison by processor 102 of executed gestures with previously stored user credential records identifying selected gestures of authorized users.

In the event processor 102 successful matches the captured imaging data with user credential records stored by authentication database for an authorized user of user device 101, the processor authorizes the access request that initiated the authentication process. In one embodiment, the user device 101 then provides the requested access to the operating environment of the user device on power-up. In other embodiments, the user device provides the requested access to the one or more of a system setting, an application program, data, and a hardware resource in the operating environment of the user device, depending on the particulars of the access request received by processor 102.

In the system of FIG. 1, the processor 102, including authentication module 104 and authentication database 106, is a component of the user device 101. The user device 101 of FIG. 1 may be self-sufficient in carrying out the authentication processes of the present disclosure.

Figure 7:
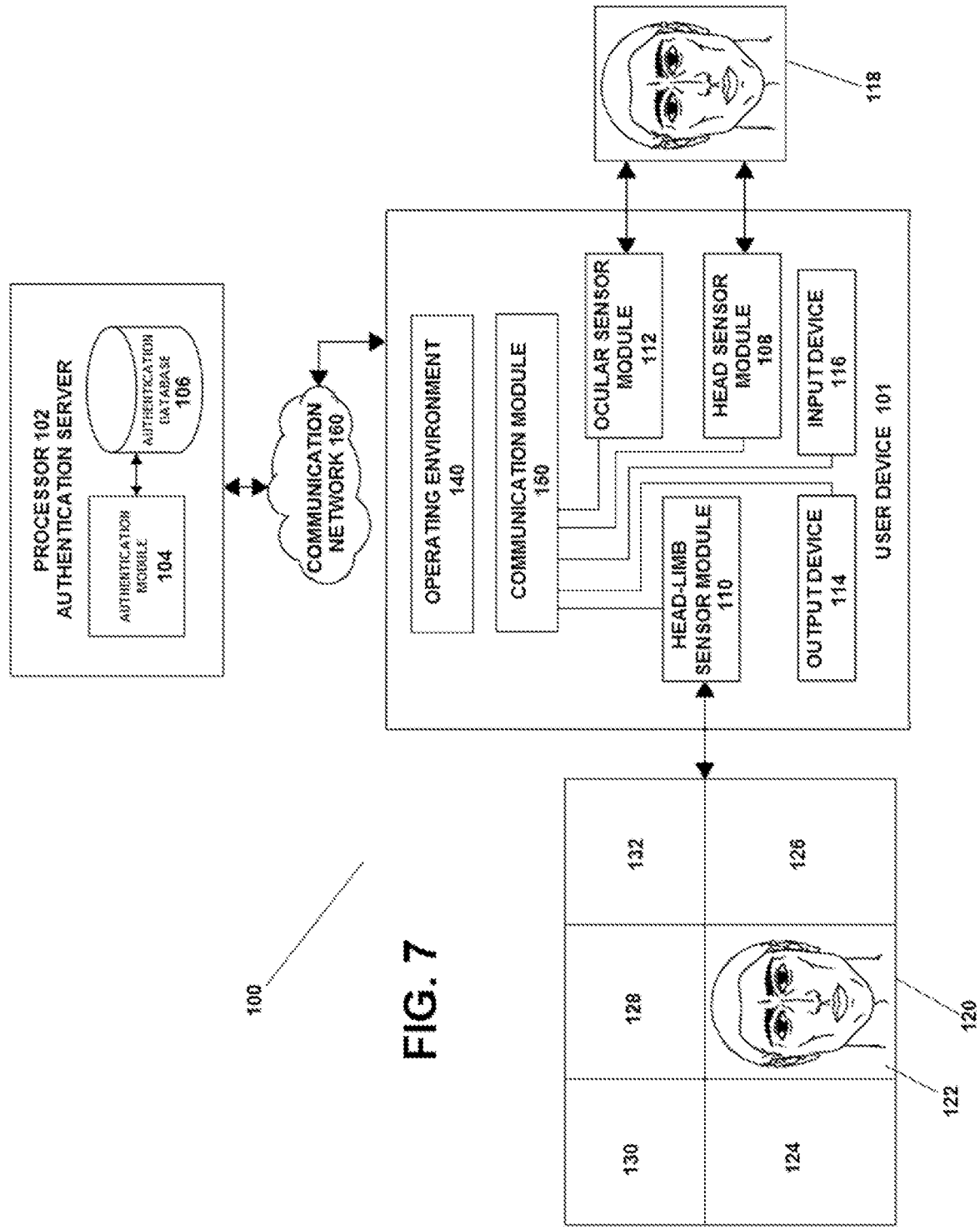
FIG. 7 is a block diagram illustrating an access control system for authenticating user access to a user device, according to an exemplary embodiment.

In an alternative embodiment shown in FIG. 7, the processor 102 is an authentication server that communicates with the user device 101 over a communication network 160 and that includes authentication module 104 and authentication database 106. In the embodiment of FIG. 7, sensor data from sensor modules 108, 110, 112, and other data such as user inputs received at input device 116, are communicated to the authentication server 102 via communication module 150. Outputs of authentication server 102 to user device 101 are received via communication module 150.

Each of the different components of user authentication system 100 may be implemented in any type of computer-based architecture including suitable processor-controlled devices that receive, process, and/or transmit digital data, configured as further described below and as shown in FIGS. 1 and 7. The user authentication system 100 may include any computing device (e.g., server, personal computer, desktop, laptop) or collection of computing devices (i.e., a distributed-computing environment), comprising processors, software modules, and non-transitory machine-readable storage media, capable of performing the various tasks and processes described herein.

According to some embodiments, the operating environment 140 may be implemented with any computer operating system (OS). Operating environment 140 may be implemented in mobile OSs, such as Android (a trademark of Google Inc.), iOS (a trademark of Cisco Technology, Inc.), iPhone (a trademark of Apple Inc.), iPad (a trademark of Apple Inc.), and Windows CE (a trademark of Microsoft Corporation). Operating environment 140 may also be implemented in desktop or laptop OSs, such as Windows and Mac OS (a trademark of Apple Inc.). As seen in FIG. 6, system 100 may provide authorized users with access to various computing resources within operating environment 140, including one or more of system settings 610, application programs 620, data 630, and hardware resources 640. In an embodiment, data 630 may include, for example, an internet resource, a text file, an image file, an audio file, and a video file.

In system 100, authentication module 104 within processor 102 receives data from authentication database 106, which is communicatively coupled to authentication module 104. In the embodiment described here, processor 102 receives data from application programs resident on user device 101, processes the received data, and stores the processed data in the authentication database 106. As shown in the block diagram of FIG. 5, authentication database 106 may include component data modules, in this embodiment including head-limb gesture credential records 510, head recognition credential records 520, ocular credential records 530, and facial recognition credential records 540. As used herein, the term "user credential records" refers to user access credentials data stored by authentication database 106 for authorized users of the user device 101, for example including head-limb gesture credential records, head recognition credential records, ocular credential records, and facial recognition credential records. User credential records can be stored in a single database, in nested databases, or otherwise interconnected databases. Authentication database 106 may be implemented as a database management system, such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data, such as, for example, a relational database, a multi-dimensional database, and the like.

Authentication module 104 requests, collects, analyzes, and presents information to and from user device 101 (in the embodiment of FIG. 7), or to and from other components of user device 101 (in the embodiment of FIG. 1). In some embodiments, data processing modules of the authentication module 104 are further configured to automatically retrieve information requested by one or more user device 101 and/or one or more software modules. Data communicated between the various devices, servers, and other components of the system 100 can be encrypted, stored, decrypted, and distributed using one or more firewalls, antivirus and anti-phishing software, file encryption protocols, and other encryption software.

The authentication module 104 also can generate graphical user interfaces on the user device 101 to facilitate interaction with the authentication module 104, and to perform associated data acquisition and processing functionalities. These interfaces can be implemented within an operating environment, a discrete GUI software layer, an application program, or any combination thereof. One or more client-side and server-side technologies or combinations thereof can be implemented to ensure that the graphical user interfaces are dynamically generated based on the updates to the records in the authentication database 106. Content for web-based or app-based interfaces can be dynamically generated on user device 101, based on updates to the authentication database 106 and plurality of inputs from the input device 116, as applicable.

In some embodiments, authentication module 104 can be executed by a server, one or more server computers, authorized client computing devices, smartphones, desktop computers, laptop computers, tablet computers, PDAs and other types of processor-controlled devices that receive, process, and/or transmit digital data. The authentication module 104 can be implemented using a single-processor system including one processor, or a multi-processor system including any number of suitable processors that may be employed to provide for parallel and/or sequential execution of one or more portions of the techniques described herein. Authentication module 104 performs these operations as a result of central processing unit executing software instructions contained within a computer-readable medium, such as within memory. In one embodiment, the software instructions of the system are read into memory associated with the authentication module 104 from another memory location, such as from a storage device, or from another computing device via communication interface. In various embodiments, the software instructions contained within memory instruct the authentication module 104 to perform processes that are described in FIGS. 2, 3, 4, 9, and 10 as described below. Alternatively, hardwired circuitry may be used in place of or in combination with software instructions to implement the processes described herein. Thus, implementations described herein are not limited to any specific combinations of hardware circuitry and software.

In certain embodiments of system 100 in accordance with FIG. 7, the authentication module 104 can interact with user device 101 through one or more application programmable interfaces ("APIs"), RSS feeds, or other structured format. In these embodiments, the authentication module 104 may provide web services to one or more applications, e.g., mobile applications, installed on the user device 101. Examples of web services include showing sensor on a website, uploading sensor data that will be used to update authentication database 106, downloading data to run custom analytics, exporting data, and the like. In other embodiments of system 100 in accordance with FIG. 1, the authentication module 104 may interact with other components of user device 101 via operating system 140. APIs are commonly a collection of one or more computing protocols and/or routines that indicate a software program's or software service's functions, and each function's requisite inputs.

For example with reference to FIG. 5, APIs may be used by authorized users to enter values of one or more head-limb gesture credential records 510, head recognition credential records 520, ocular credential records 530, and facial recognition credential records 540 for storage in authentication database 106. In another example, API's may be used by authorized users of the user device 101 to update previously stored head-limb gesture credential records 510, head recognition credential records 520, ocular credential records 530, and facial recognition credential records 540. User credential records serve as user-supplied information for authenticating access to the operating environment of a user device 101, and users may update user credential records much as users of a user device may update passwords. One or more of sensor modules 108, 110, 112 may capture imaging data or other sensor data of gestures selected by authorized users, such as head gestures, eye gestures, and head-limb gestures, to be incorporated in user credential records to be stored by authentication database 106.

In addition, an authorized user may select one or more gesture cue to be stored by processor 102 for later display by display device 114. A gesture cue alerts an authorized user to execute gestures matching user credential records stored for the authorized user. For example, an authorized user may select a gesture cue (i.e., head recognition cue) to execute a given head position matching a head recognition credential record stored for the authorized user. As another example, an authorized user may select a gesture cue (i.e., ocular cue) to execute a given eye movement matching an ocular credential record stored for the authorized user. As a further example, an authorized user may select a gesture cue (i.e., head-limb gesture cue) to execute a given hand-to-face gesture matching a head-limb gesture credential record stored for the authorized user.

In the embodiment of FIG. 1, components of user device 101 include a processor 102 with an authentication module 104, authentication database 106, and operating environment 140. Additional components include a head sensor module 108, a head-limb sensor module 110, an ocular sensor module 112, one or more output device 114, and one or more input device 116. The operation of imaging sensor modules 108, 110, and 112, of output device 114, and of input device 116, may be generally similar as to the embodiments of FIGS. 1 and 7, and the following descriptions of these components applies to both of these embodiments.

Output device 114 may include a visual output device such as a visual display and/or an audio output device such as a speaker. For example, output device 114 may include one or more display screen that is used to display facial gesture cues in the form of images or visual messages as part of the present system and method for authenticating user access via multi-factor image credentials. Input device 116 may include a keyboard, a touch sensitive pad, a mouse, a track ball, a pen device, a joystick, a game controller, a motion detecting device, a microphone, and a camera, among others.

In an embodiment, one or more of head sensor module 108, head-limb sensor module 110, and ocular sensor module 112 comprises an imaging sensor, also herein called an imaging sensor module. In an embodiment, an imaging sensor is a camera capable of capturing both video and still images. User computing devices are commonly equipped with cameras, which may be capable of capturing video and snapshots of a user. An imaging sensor may include a single camera, or multiple cameras providing additional image capture capabilities.

In an embodiment, imaging sensor modules employ two-dimensional imaging. In another embodiment, one or more imaging sensor module employs three-dimensional imaging including a depth dimension. Three dimensional imaging is useful in the head-limb sensor module 110, as it enables depth imaging of facial features, and depth imaging of the hand segmented over the face. Three dimensional facial features models can include facial surface configurations, e.g., contours of eyebrows, eyes, nose, lips and chin. Depth values and thresholding techniques can be used to model the hand segmented over the occluded face.

In some embodiments the head sensor module 108 is implemented as software configured to control associated hardware, and configured to receive hardware operation data from head sensor module 108. In an embodiment, head sensor module 108 interacts with a user to generate head position data, and provide the head position data to processor 102. In these embodiments, head position data includes data describing the movement of the user's head. In an example, head sensor module 108 is implemented as software configured to control camera hardware (e.g., a camera pair, not shown) included within user device 101 that is configured to determine the position of the user's head. In various embodiments, head position data may include a position of the user's head with respect to a field of view 118 of the head sensor module 108 encompassing the user's head (static imaging, e.g., still camera image), or may include a path of head movement of the user during a period of image capture by an head sensor module 108 (dynamic imaging, e.g., multi-frame video images).

Head sensor module 108 may utilize sensor or camera data to determine the initial head position of a user and any subsequent change from the initial head position. In one embodiment, a light (e.g., infrared) is reflected from the user's head and a video camera or other sensor can receive the reflection from the user's head. The head sensor module 108 analyzes the head position data to determine head movement from a change in the light reflection. A vector between a location on the user's head and the head reflections can be used to compute a change in head position or direction. Head position data may be based upon a movement and/or a fixation, which may alternate. A fixation is generally maintaining a head position in single location. A movement is generally any change in position of the head from an initial position.

In one implementation, the head sensor module 108 can use a marker technique, wherein a marker in the field of view of the head sensor module is used as a point of reference to determine user movement.

In another embodiment, a camera or sensor can track head image features, e.g., a cheek or the top of the head, if only a portion of the head is shown and follow the features as the head rotates or moves. It is preferable that the head tracking data is obtained in a manner that is non-invasive.

In an embodiment, head sensor module 108 is an imaging sensor that provides facial recognition. Vision-based techniques for facial recognition can vary in the number of cameras used; their speed and latency; the imaging environment (restrictions such as lighting); low-level features used (edges, regions, silhouettes, moments, histograms); whether 2-D or 3-D representation is used; and whether time is represented. There is an inherent loss in information whenever a 3-D image is projected to a 2-D plane. Vision-based techniques can handle properties such as texture and color in facial recognition. Desirably, the image(s) provided by head sensor module 108 when used in facial recognition should be of sufficient resolution, clarity, and focus to enable the algorithms to adequately match the image to a facial recognition credential record for an authorized user.

Embodiments of the invention may include passive or active operation of the head sensor module 108 to obtain one or more user facial image of suitable quality for facial recognition. When employing facial recognition in a passive manner, a user will be passively authenticated through facial recognition based upon imaging data captured automatically by one or more camera at the user device 101. The camera in this example would be positioned on the user device 101 such that the head of a user would be included in the field of view 118 when the person is interacting with the user device, such as by looking and/or interacting with a display screen or other output device 114 of the user device. It should be understood, however, that the head sensor module 108 may include additional and/or alternative cameras placed in similar or alternative locations in accordance with various embodiments, and that information from any or all of these cameras can be analyzed as appropriate. Alternatively, in an active mode, the system may for example ask the user to face the camera, or provide other instructions for positioning the user's head during authentication proceedings.

In an embodiment, the processor 102 analyzes a detected facial image of a user within imaging data captured by head sensor module 108 using one or more facial recognition algorithms to attempt to identify the person contained in the image. This can include identifying unique or distinguishing points, landmarks, geometric shapes or distances, or other such features on the face, which can be compared or mapped against information stored in authentication database for an authorized users, e.g., customers of a financial institution. Example facial recognition algorithms can include, for example, a linear discriminate analysis algorithm, a Fisherface algorithm, a Hidden Markov model-based algorithm, a principal component analysis algorithm, and a neuronal motivated dynamic link matching algorithm, among others.

In another embodiment, the head sensor module 108 may utilize a face or head detection algorithm to attempt to locate an approximate head or face position in a captured image or video frame, to improve the quality of facial recognition. Isolation of the person's face can improve results in at least some embodiments in facial recognition techniques that attempt to detect color variations in the person's face.

Ocular sensor module 112, also herein sometimes called eye-tracking module, may utilize imaging sensor or camera data within a field of view 118 of the imaging sensor including the head of the user, to determine the gaze of a user. In one embodiment, a light (e.g., infrared) is reflected from the user's eye and a video camera or other imaging sensor can receive the corneal reflection. The ocular sensor module 112 analyzes the ocular sensor data to determine eye rotation from a change in the light reflection. A vector between a pupil center and the corneal reflections can be used to compute a gaze direction. Eye movement data may be based upon a saccade and/or a fixation, which may alternate. A fixation is generally maintaining a visual gaze on a single location, and it can be a point between any two saccades. A saccade is generally a simultaneous movement of both eyes between two phases of fixation in the same direction.

In one implementation, the ocular sensor module 112 can use a dark-pupil technique, whereby if the illumination source is offset from the optical path, then the pupil appears dark as the retroreflection from the retina is directed away from the camera. In another implementation, the ocular sensor module can use a bright-pupil technique, whereby if the illumination is coaxial with the optical path, then the eye acts as a retro reflector as the light reflects off the retina creating a bright pupil effect.

In another embodiment, a camera or sensor can track eye image features (e.g., retinal blood vessels) and follow the features as the eye rotates. It is preferable that the ocular recognition data is obtained in a manner that is non-invasive.

In yet another embodiment, a camera or sensor can identify a location of an iris or pupil based on the circular shape or by detection of an edge. The movement of the iris or pupil can then be detected.

In some embodiments, the ocular sensor module 112 can use a coding system that recognizes eye movement and/or gaze direction and generates a score based on duration and direction. Eye movement or gazing may have a duration of about ¹⁄25 of a second to 2 seconds or longer, so the ocular sensor module 112 will receive a data feed of eye movements from a high speed camera having increments of less than one second to account for very quick changes. Some micro-eye movements occur so quickly that a human observer cannot detect or sense the shift in gaze or eye movement. In this embodiment, a successful match between ocular recognition data and an ocular credential record stored by processor 102, can be determined by the ocular recognition data score exceeding a predetermined threshold.

In various embodiments, head sensor module 108 and ocular sensor module 112 may be deployed in a multi-factor authentication process that generates a head recognition cue to execute a head gesture, and that generates an ocular cue to execute an ocular gesture. In an embodiment, the head recognition cue and ocular cue are combined in a head-ocular cue, which instructs the user to execute the head gesture simultaneously with executing the ocular gesture. In this embodiment, the head sensor module 108 captures imaging data, and the ocular sensor module 112 captures ocular recognition data, during a common capture time period. The ocular gesture may be aligned with the head gesture to be executed during the common capture time period.

Figure 11:
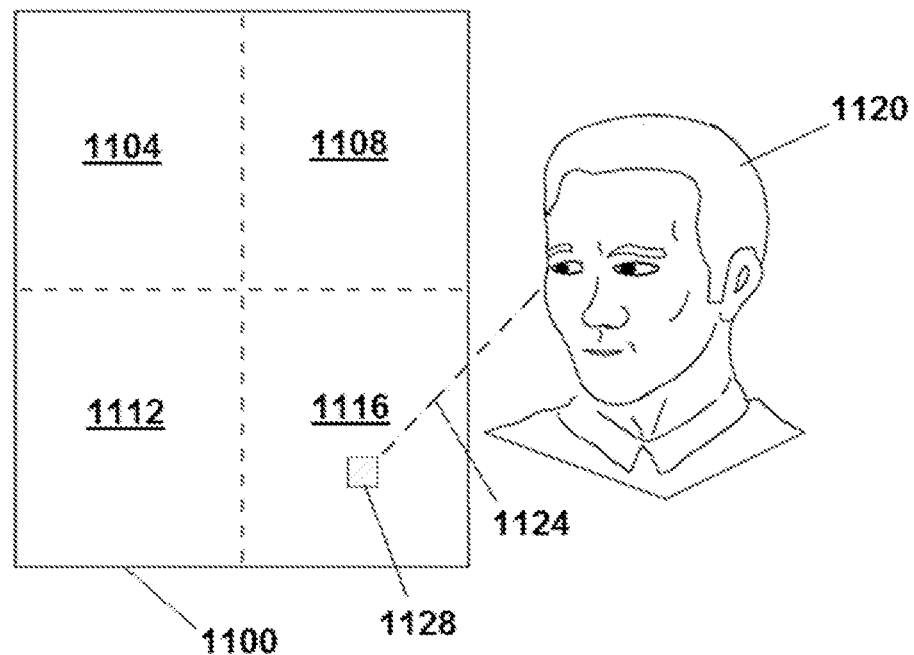
FIG. 11 is a functional diagram illustrating a first use case for presenting a head recognition cue and an ocular cue to a user, according to an exemplary embodiment.

FIG. 11 is a functional diagram illustrating a first use case for presenting a head recognition cue and an ocular cue to a user in a combined head-ocular cue, providing instructions to execute a head gesture simultaneously with executing an ocular gesture. A visual display 1100 is divided into four partitions 1104, 1108, 1112, and 1116. A head recognition cue instructs the user to face a given partition, i.e., the lower right partition 1116. At the same time, an ocular cue instructs the user to direct his gaze to the point of regard 1128, which is located within partition 1116 faced by the user. In this manner, a head-ocular cue including both these gesture cue elements instructs the user to execute a static (posed) ocular gesture that is aligned with a static (posed) head gesture.

Figure 12:
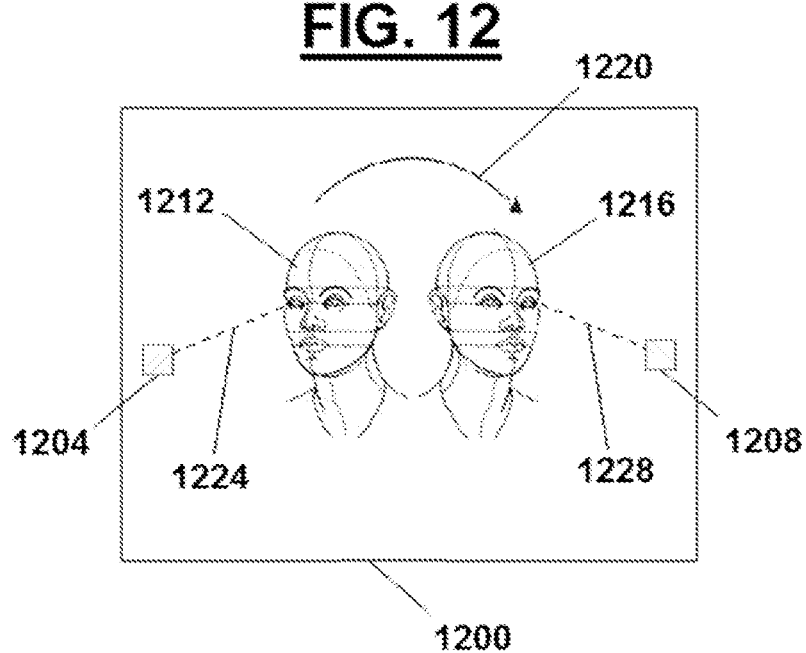
FIG. 12 is a functional diagram illustrating a second use case for presenting a head recognition cue and an ocular cue to a user, according to an exemplary embodiment.

FIG. 12 is a functional diagram illustrating a second use case for presenting a head recognition cue and an ocular cue to a user in a combined head-ocular cue, providing instructions to execute a head gesture simultaneously with executing an ocular gesture. FIG. 12 shows a user gazing at a visual display 1200, as viewed from behind the visual display. Visual display 1200 includes two target locations 1204, 1208. A head recognition cue instructs the user to face the side of the visual display including the first location 1204, then to turn her head to face the side including the second location 1208. At the same time, an ocular cue instructs the user to direct her gaze to the location 1204, then to move her eyes to redirect her gaze to the location 1208. In this manner, a head-ocular cue including both these gesture cue elements instructs the user to execute a dynamic (moving) ocular gesture that is aligned with a dynamic (moving) head gesture.

Turning back to FIGS. 1 and 7, the head-limb sensor module 110 captures imaging data within a field of view 120 of the sensor module. Field of view 120 encompasses a head region including the head of the user. As used herein, "head region" refers to a region encompassing the head of the user, as well as regions proximate the head of the user. For example, the head region of field of view 120 includes sub-region 122 encompassing the head of the user, and various sub-regions proximate the head of the user. Sub-regions proximate the head of the user include sub-regions 124, 126 to either side of the sub-region 122 including the head of the user, sub-regions 128, 130, 132 immediately above the sub-regions 122, 124, 126, i.e., just above the head of the user. Field of view 120 is illustrated as a two-dimensional field of view for two dimensional imaging, but a three dimensional field of view including a depth dimension also may be used when employing three dimensional imaging.

In an embodiment, head-limb sensor module 110 captures imaging data on head-limb gestures. In an embodiment, head-limb gestures include two major categories of gestures: hand-to-face gestures, and limb-near-head gestures. As used in the present disclosure, "limb" refers to a person's arm(s), hand(s), or finger(s). As used in the present disclosure, hand-to-face gestures include physical movements or posed configurations of one or both of a user's hands, or of a user's fingers, over the user's face, also herein called occlusion of the user's face. (Note, in descriptions herein of hand-to-face gestures, the term "hand" for convenience also encompasses gestures involving fingers). As used in the present disclosure, limb-near-head gestures include physical movements or posed configurations of a user's limb(s) within a defined head region (e.g., region 120 in FIG. 1) in proximity to a user's head, not including a user's hand(s) or finger(s) over the user's face.

Head-limb gestures can be static, in which a captured image of a head-limb gesture assumes a certain pose or configuration. Head-limb gestures also can be dynamic, in which captured images of the head region change configuration over time during a time period in which a moving image, or multiple still images, are captured. Geometric aspects of head-limb gesture recognition may include spatial information, i.e., where a gesture occurs, and pathic information, i.e., the path a dynamic gesture takes.

Hand-to-face gestures have been overlooked in many facial analysis systems. Such systems often extract data on geometry or appearance of facial features. As the face becomes occluded, facial features may be lost, corrupted, or erroneously detected. In traditional facial recognition systems, face occlusions are treated as noise, even though they carry useful information.

In an embodiment, the present user authentication method categorizes hand-to-face gestures using a classification system. A classification system for hand-to-face gestures may be used in coding head-limb gesture credential records stored by the processor, and in analyzing captured imaging data for comparison with head-limb gesture credential records. In an embodiment, hand-to-face gestures may be coded using three classifications: hand-fingers shape; hand-fingers action; and facial region occluded. Examples of hand-fingers shapes include open hand, closed hand, both hands, index finger, other finger(s). Examples of hand-fingers actions include holding, leaning (face on hand), stroking/tapping (e.g., cheeks, chins, forehead, lips).

Figure 8:
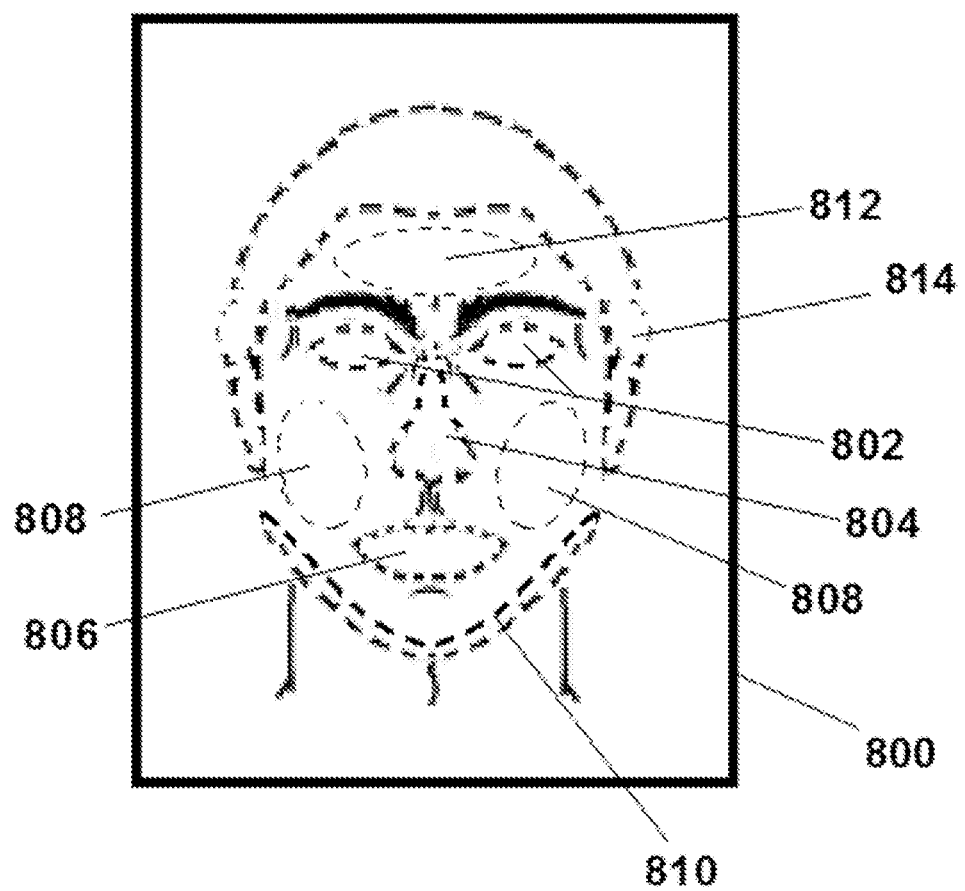
FIG. 8 is a schematic diagram of a hand-to-face gesture classification scheme for facial region occluded according to an exemplary embodiment.

FIG. 8 illustrates a classification scheme for facial region occluded. Images of the face can be subdivided into sub-regions corresponding to facial features. A two-dimensional facial feature model 800 includes the following facial regions: eyes 802, nose 804, lips 806, cheeks 808, chin 810, forehead 812, and hair/ears 814.

Examples of hand-to-face gestures include holding the forehead, leaning face on a hand, touching the nose with index finger, stroking the chin, tapping a cheek with fingers, posing open hand to lips, posing closed hand to chin, posing both hands at ears, moving open hand to cover an eye, moving closed hand to lips, and moving both hands to hair.

In an embodiment, the present user authentication method categorizes limb-near-head gestures using a classification system. Like the classification of hand-to-face gestures, a classification system for limb-near-head gestures may be used in coding head-limb gesture credential records stored by the processor, and in analyzing captured imaging data for comparison with head-limb gesture credential records. An exemplary coding system for limb-near-head gestures includes limb position, limb motion path, and limb shape. Coding limb position of limb-near-head gestures may utilize sub-regions of the field of view of captured imaging data, such as sub-regions 122, 124, 126, 128, 130, and 132. By identifying one or more sub-region in which a limb-near-head gesture occurs, the system can identify the spatial relationship between the detected limb and the user's head. Limb position examples include arms extending horizontally to the head (but not covering the face) in regions 124, 122, and 126, which may indicate arms crossed behind the user's head; and a vertically extending limb in regions 124 and 130, which may indicate an arm raised at one side of the user's head.

An example of a limb motion path is side-to-side motion of the upper limb extremity (hand) between regions 128 and 132. This motion may indicate a waving gesture. Another example of a limb motion path is up-and-down motion of an arm extending vertically between regions 124 and 130.

An example of limb shape classification is classifying the shape of a limb extremity (i.e., hand), such as circular or tetragonal, which may aid in identifying features such as a closed hand versus an open hand. Another example of limb shape classification is classifying the length and angle of an extending arm.

Examples of limb-near-head gestures include waving an arm, raising an arm, raising both arms, arms crossed behind head, hands on top of head, hands raised over head, open hand near head, closed hand near head, and hands pressed together near head.

Method for Authenticating User Access to a User Device

In some embodiments, one or more computing devices perform a plurality of processes that are part of a system for authenticating user access to an operating environment of a user device, in response to receiving an access request. While the blocks in the disclosed processes are shown in a particular order, the actual order may differ. In some embodiments, some steps may be performed in parallel.

Figure 2:
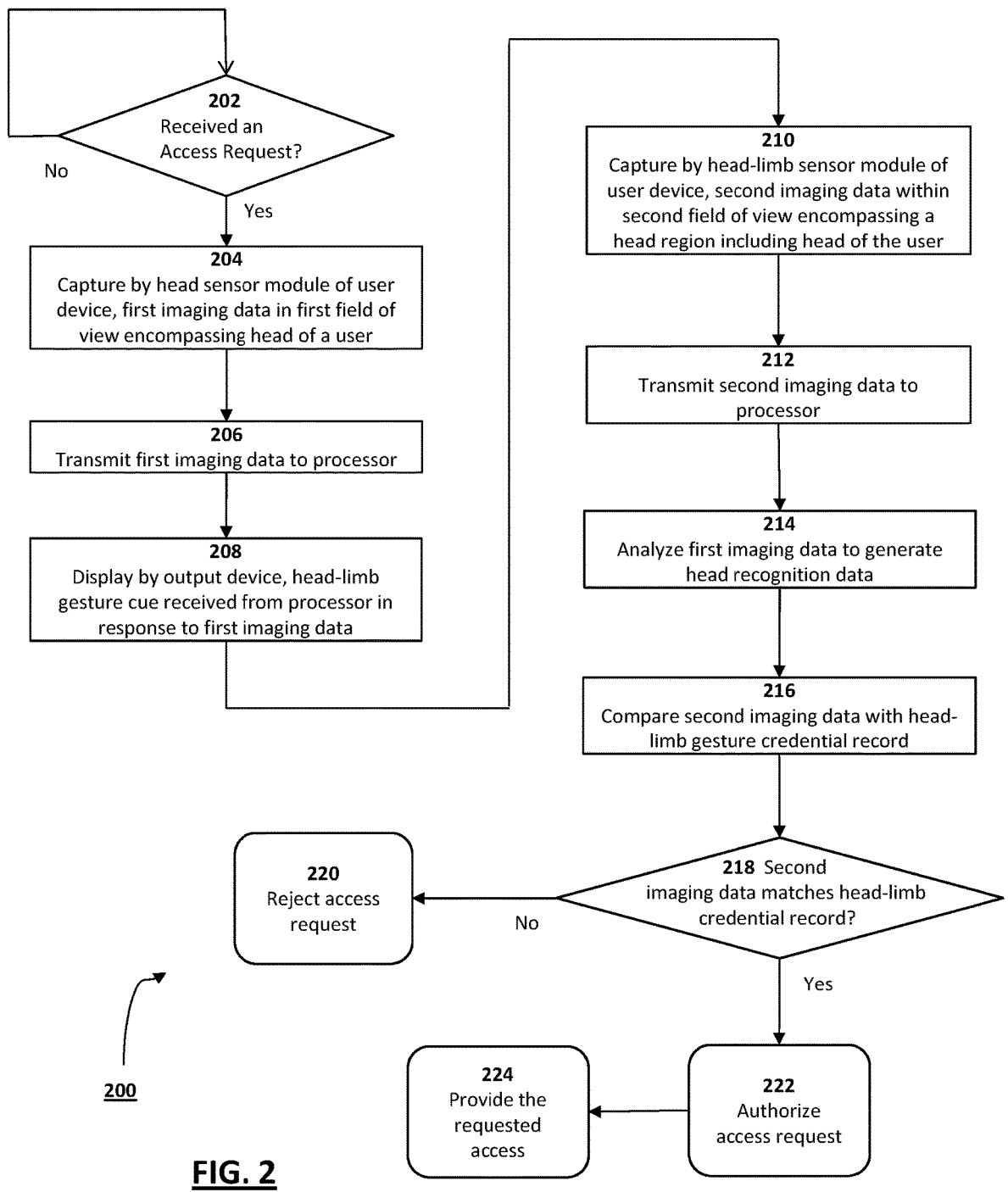
FIG. 2 is a flowchart of an exemplary access control method for authenticating user access to a user device, according to an exemplary embodiment.

FIG. 2 is a flowchart showing a process 200 for authenticating a user accessing an operating environment of a user device using biometric authentication based upon captured head imaging data, according to an exemplary embodiment. (As used herein, biometric authentication includes authentication via gesture recognition). In the event the process 200 authenticates the user as authorized to access the user device, the process provides requested access to the operating environment of the user device, or to one or more resources within that operating environment.

In an embodiment, the plurality of steps included in process 200 may be performed by one or more computing devices or processors in the system of FIG. 1. In an embodiment, the plurality of steps included in process 200 may be performed by a processor 102 in operative communication with a user device 101.

The authentication process 200 can be activated in response to a start-up routine during power up of the user device, wherein the startup routine includes a requested access to an operating environment of the user device. Alternatively, the authentication process can be activated via receiving a user input within the operating environment of the user device, wherein the user input includes requested access to one or more resource within the operating environment. In an embodiment, the user input may include requested access to one or more of a system setting, an application program, a data, and a hardware resource in the operating environment of the user device. In an embodiment, an access request for data may include requested access to one or more of an internet resource, a text file, an image file, an audio file, and a video file.

In a first step 202, a processor (such as processor 102) in operative communication with the user device detects an access request, such as by receiving an access request for access to an operating environment of the user device generated by a start-up routine of the user device setting on power-up, or by detecting a user input indicating a request for access to one or more resources within the operating environment of the user device. Upon receiving the access request, the processor triggers the first authentication process of the method for authenticating user access. If the processor does not detect receipt of an access request, the authentication process continues to monitor one or more mechanisms of the user device for receiving of an access request.

As step 204, in response to receiving the access request a head sensor module of the user device captures first imaging data, wherein the head sensor module is in operative communication with the processor. In an embodiment, the head sensor module captures the first imaging data within a first field of view encompassing the head of a user of the user device.

In an embodiment, the head sensor module is a single camera associated with the user device. In another embodiment, the head sensor module includes multiple cameras associated with the user device. In an embodiment of step 204, the head sensor module is a still camera that captures a single still image. Alternatively a still camera may be operated sequentially to capture a plurality of still images at different points in time within a time period of capturing the first imaging data. In another embodiment of step 204, the head sensor module is a video camera that captures multiple image frames over a period of time of capturing the first imaging data.

At step 206, the head sensor module transmits the first imaging data to the processor. Upon receipt of the first imaging data, the processor may initiate head recognition algorithms, comparing the first imaging data with head recognition templates to detect one or more of position of the user's head, movement of the user's head, and features of the user's face. In another embodiment, upon receipt of the first imaging data, processor may initiate facial recognition algorithms, comparing the first imaging data within the first field of view encompassing the head of the user, with facial recognition credential records stored by the processor for one or more users authorized to access the user device.

At step 208, an output device of the user device displays a head-limb gesture cue in in response to the transmission of the first imaging data at step 206. The output device of the user terminal may be a visual output device such as a display screen, an audio output device such as a speaker, or a device that provides both audio and visual outputs. As used in the present application, the "display" of the facial gesture cue may be a visual display, an audio display, or both.

The head-limb gesture cue displayed at step 208 serves to alert the user to the need to make a head-limb gesture. Additionally, the head-limb gesture cue may provide the user with information on what head-limb gesture should be made. In an embodiment, the head-limb gesture cue may provide instructions on when the head-limb gesture should start, and information on the duration of capture of second imaging data of the user by the head-limb sensor module.

In an embodiment, the head-limb gesture cue may indicate whether the head-limb gesture should be a posed head-limb gesture or a dynamic head-limb gesture.

In an embodiment of step 208, the head-limb gesture cue includes an instruction to carry out a secret head-limb gesture. A secret head-limb gesture is a head-limb gesture that is not apparent to any viewer (or listener) of the head-limb gesture cue, but depends on secret knowledge of an authorized user. There can be many ways to indicate a secret head-limb gesture to a user, including for example a plurality of secret head-limb gestures with different temporal limitations (e.g., "make your head-limb gesture for this week"); selection from a list of secret gestures (e.g., "make your second head-limb gesture"); or a head-limb gesture identified by any other information known only to the authorized user. Secret head-limb gesture gestures can provide additional security associated with authentication factors based upon secret knowledge.

At step 210, a head-limb sensor module of the user device captures second imaging data, wherein the head-limb sensor module is in operative communication with the processor. In an embodiment, the head-limb sensor module captures the second imaging data within a second field of view that encompasses a head region including the head of the user.

In an embodiment of step 210, the head-limb sensor module is a single camera associated with the user device. In another embodiment, the head-limb sensor module includes multiple cameras associated with the user device. In an embodiment of step 210, the head-limb sensor module is a still camera that captures a single still of a head region of the user, including the head of the user. In an embodiment, a still camera of the head-limb sensor module captures static image data representative of a posed head-limb gesture. Alternatively a still camera may be operated sequentially to capture a plurality of still images at different points in time within a time period of capturing the second imaging data.

In another embodiment of step 210, the head-limb sensor module is a video camera that captures multiple image frames of a head region including the head of the user, including the head of the user, over a period of time of capturing the second imaging data. In an embodiment, a video camera of the head-limb sensor module captures multi-frame video data representative of a dynamic head-limb gesture.

In an embodiment of step 210, the head-limb sensor module captures a two dimensional image of a head region including the head of the user. In another embodiment, the head-limb sensor module captures a three dimensional image of a head region including the head of the user. In an embodiment, the head-limb sensor module captures a three dimensional image of a hand-to-face gesture, including depth image of a hand occlusion of a facial image.

At step 212, the head-limb sensor module transmits the second imaging data to the processor. Upon receipt of the first imaging data, the processor may initiate gesture recognition algorithms, comparing the second imaging data with computer vision templates to detect one or more of a hand-to-face gesture, and a limb-near-head gesture. Additionally on receipt of the first imaging data, the processor may retrieve from an authentication database, one or more head-limb gesture credential records stored for authorized users of the user device, for comparison with the second imaging data.

At step 214, the processor analyzes the first imaging data to generate the head recognition data. In an embodiment, the head recognition data is representative of one or more of a position of the head of the user, a movement of the head of the user, and features of a head of the user. Step 214 may be commenced at any time after transmission of the first imaging data to the processor at step 206, and may be effected in parallel with steps 208, 210, and 212.

In an embodiment of step 214, after analyzing the first imaging data to generate the head recognition data, the processor compares the head recognition data with one or more head recognition record stored by the processor for one or more authorized users of the user device.

In an embodiment of step 214, the output device provides a visual display including a plurality of partitions. The processor analyzes the first imaging data to generate head recognition data representative of a static position of the head of the user facing a given partition of the plurality of partitions. In an embodiment, the display screen may display information or graphics cueing the user to face the given partition. In an embodiment, the given partition may be known to the authorized user, but not to other users, representing a secret knowledge authorization factor.

In a further embodiment of step 214 providing a visual display including a plurality of partitions, the user device further includes an ocular sensor module that generates ocular recognition data representative of a point of regard of the user. The system compares the point of regard sensed by the ocular sensor module with the head recognition data, and determines whether the sensed point of regard falls within the given partition indicated by the head recognition data representative of movement of the head of the user to face the given partition.

At step 216, the processor compares the second imaging data with one or more head-limb gesture credential records stored for one or more authorized user of the user device. In an embodiment, the processor compares the second imaging data with one or more stored head-limb gesture credential record selected from a plurality of stored head-limb gesture credential records, herein sometimes called an "appropriate" head-limb gesture credential record(s). For example, a plurality of stored head-limb gesture credential records may be associated with different temporal limitations such as days of the week, and the comparison of step 216 compares only with one or more head-limb gesture credential records associated with the current day of the week.

In an embodiment, the head-limb gesture credential record is representative of one or more of a hand-to-face gesture and a limb-near-head gesture. In various embodiments, the head-limb gesture credential record is representative of a hand-to-face gesture selected from one or more of holding a facial feature, touching a facial feature, stroking a facial feature, tapping a facial feature, posing open hand to face, posing closed hand to face, posing both hands to face, moving open hand to face, moving closed hand to face, moving both hands to face, and leaning on hand. In other embodiments, the head-limb gesture credential record is representative of a limb-near-head gesture selected from one or more of waving an arm, raising an arm, raising both arms, arms crossed behind head, hands on top of head, hands raised over head, open hand near head, closed hand near head, and hands pressed together near head.

In an embodiment of step 216, the comparison analyzes the second imaging data to detect a head-limb gesture that corresponds to a head-limb gesture represented by one of the one or more head-limb gesture credential records stored for one or more authorized user of the user device. For example, the stored head-limb gesture credential record may be an image of a person's head representative of a hand-to-face gesture comprising an open hand covering the person's mouth. In this embodiment, a successful match may require that the second imaging data correspond to an image of a person with an open hand covering the person's mouth, but not require that the person be recognized as the same person as in the stored head-limb gesture credential record.

In another embodiment of step 216, the comparison analyzes the second imaging data to detect a head-limb gesture that corresponds to a head-limb gesture represented by one of the head-limb gesture credential records stored for one or more authorized user of the user device, and additionally may compare the second imaging data with the stored head-limb gesture credential records to recognize that the second imaging data and one or the stored head-credential records identify the same person. For example, the stored head-limb gesture credential record may be an image of a person raising his arm next to his head. In this embodiment, a successful match may require both that the second imaging data correspond to an image of a person raising his arm next to his head, and may require facial recognition of the second imaging data in comparison with the face of the person in the stored head-limb gesture credential record.

In a further embodiment of step 216, the comparison analyzes the second imaging data to detect a head-limb gesture that corresponds to a head-limb gesture represented by one of the one or more head-limb gesture credential records stored for one or more authorized user of the user device, and additionally may compare the first imaging data with head recognition credential records, or with facial recognition credential record, stored by the processor for an authorized user. For example, facial recognition analysis of the first imaging data may match a facial recognition credential record for an authorized user of the user device. An exemplary stored head-limb gesture credential record, known only to the authorized user, is a dynamic image of a person stroking his chin with beard. In this embodiment, a successful match may require both that the first imaging data match a facial recognition record for an authorized user with beard, and require that the second imaging data correspond to an image of a person stroking his chin with beard. This two-factor, biometric plus gesture, authentication procedure is more secure than facial recognition authentication alone, which may be spoofed using a photograph of an authorized user.

In another embodiment of step 216, the analysis of the second imaging data includes head recognition analysis of the second imaging data. For example, head recognition analysis of the second imaging data may indicate a head position facing toward the right. Head-limb gesture analysis of the second imaging data can use this head position information to recognize one of the user's ears partially occluded by the person's hand in a hand-to-face gesture.

If the system does not match the second imaging data with an appropriate head-limb gesture credential record of an authorized user at 218, the method rejects the transaction for processing 224. If the system successfully matches second imaging data with an appropriate head-limb gesture credential record of an authorized user at 218, the method authorizes the transaction for processing at 222.

Upon authorization of the user transaction for processing at 222, the user terminal provides the requested access to the user device at 224. The requested access may be access to the operating environment of the user device in an access request generated as part of a power-up routine of the user device. Alternatively, the user device may provide access requested by the user to one or more resources within the operating environment of the user device. In an embodiment, at 224 the user device provides access to one or more of a system setting, an application program, a data, and a hardware resource in the operating environment of the user device. In an embodiment, at 224 the user device provides access to data including one or more of an internet resource, a text file, an image file, an audio file, and a video file.

Figure 3:
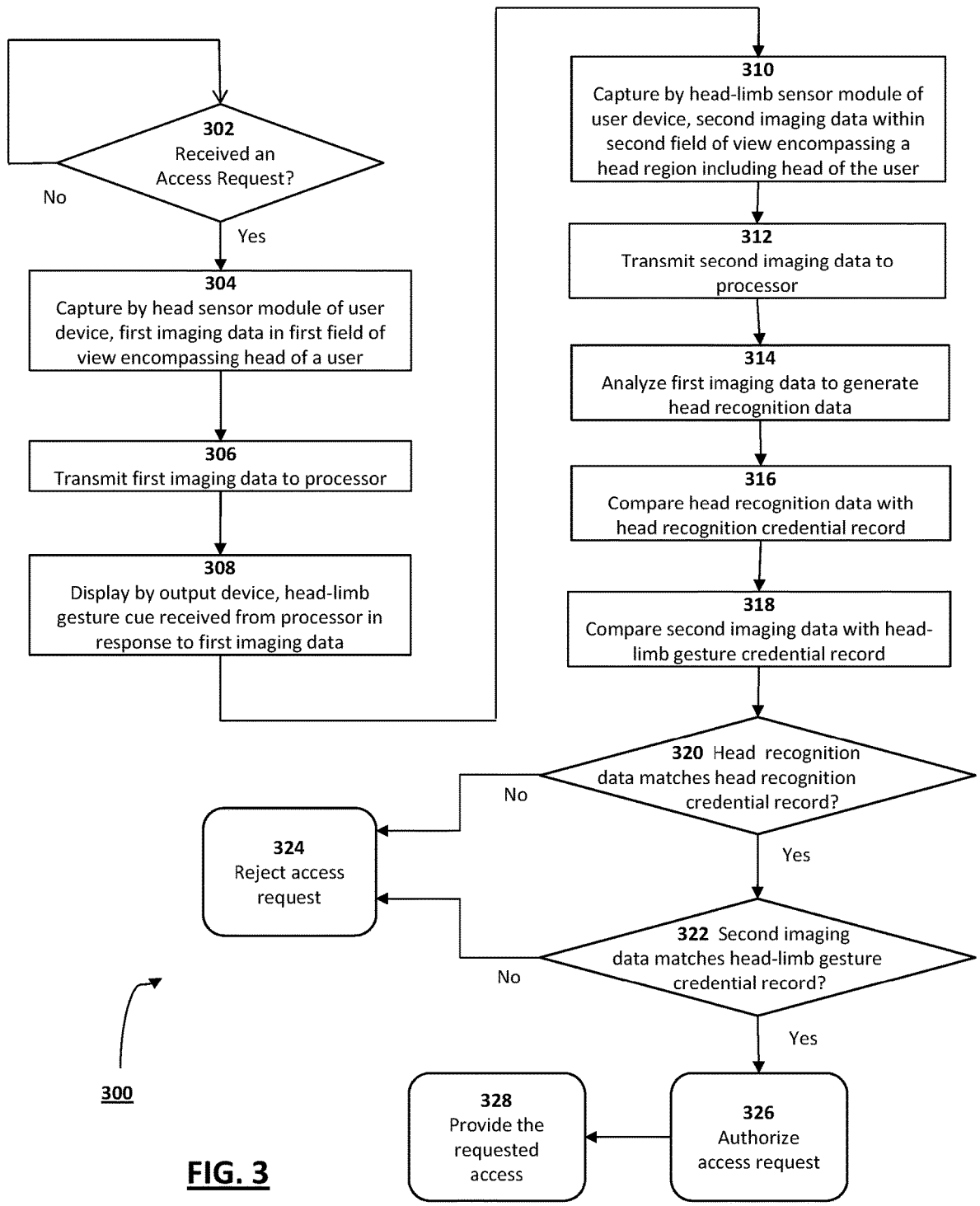
FIG. 3 is a flowchart of an exemplary access control method for authenticating user access to a user device, according to an exemplary embodiment.

FIG. 3 is a flowchart showing another process 300 for authenticating a user accessing an operating environment of a user device using biometric authentication based upon captured head imaging data, according to an exemplary embodiment. In the event the process 300 authenticates the user as authorized to access the user device, the process provides requested access to the operating environment of the user device, or to one or more resources within that operating environment. The process 300 includes additional steps relating to a second authentication factor for user authentication, involving head recognition data generated through analysis of first imaging data. In the following discussion, generally only the additional steps relating to the second authentication factor involving head recognition data are described. The other steps of process 300 correspond to various steps of the process 200 of FIG. 2, and reference should be had to the discussion of process 200 for a description of these corresponding steps.

At step 314, corresponding to step 214 of FIG. 1, the processor analyzes the first imaging data to generate the head recognition data. In an embodiment, the head recognition data is representative of one or more of a position of the head of the user, a movement of the head of the user, and features of a head of the user. Step 314 may be commenced at any time after transmission of the first imaging data to the processor at step 306, and may be effected in parallel with steps 308, 310, and 312.

At step 316, the method compares the head recognition data with one or more head recognition credential record stored for an authorized user. This comparison may be based upon one or more head recognition factors appropriate the head recognition credential record stored for an authorized user. In an embodiment, this comparison may implement a secret-knowledge authentication factor, e.g., based upon a head position or head movement known only to an authorized user.

In an example of the head recognition data comparison of step 316, a head recognition credential record based upon static first imaging data corresponds to a head position facing a given partition of a display screen output device, such as a partition at the upper right corner of the display screen. At step 316 the method analyzes the head recognition data to determine whether this data corresponds to a head facing the given partition at the upper right corner of the display screen. In another example of the head recognition data comparison 316, a head recognition credential record based upon dynamic first imaging data corresponds to a head movement starting facing to the left side of a display screen, then turning the head to face to the right side of the display screen. At step 316 the method analyzes the head recognition data to determine whether this data corresponds to a head movement that starts facing to the left side of a display screen, then turns the head to face to the right side of the display screen.

Steps 320 and 322 implement a two-factor authentication process that includes the head recognition data authentication as a first factor and the head-limb gesture authentication as a second factor, requiring success of both factors in order to authenticate the user. If the system does not match the head recognition data with a head recognition credential record of an authorized user at 320, the method rejects the access request 324. If the system successfully matches the head recognition data with a head recognition credential record of an authorized user at 320, but the comparison step 318 does not match the second imaging data with a head-limb gesture credential record of an authorized user at 322, the method rejects the access request 324. If the system successfully matches both authentication factors at 320, 322, the method authorizes the access request at 326.

Upon authorization of the user transaction for processing at 326, the user terminal provides the requested access to the user device at 328. The requested access may be access to the operating environment of the user device in an access request generated as part of a power-up routine of the user device. Alternatively, the user device may provide access requested by the user to one or more resources within the operating environment of the user device. In an embodiment, at 328 the user device provides access to one or more of a system setting, an application program, a data, and a hardware resource in the operating environment of the user device. In an embodiment, at 328 the user device provides access to data including one or more of an internet resource, a text file, an image file, an audio file, and a video file.

Figure 4:
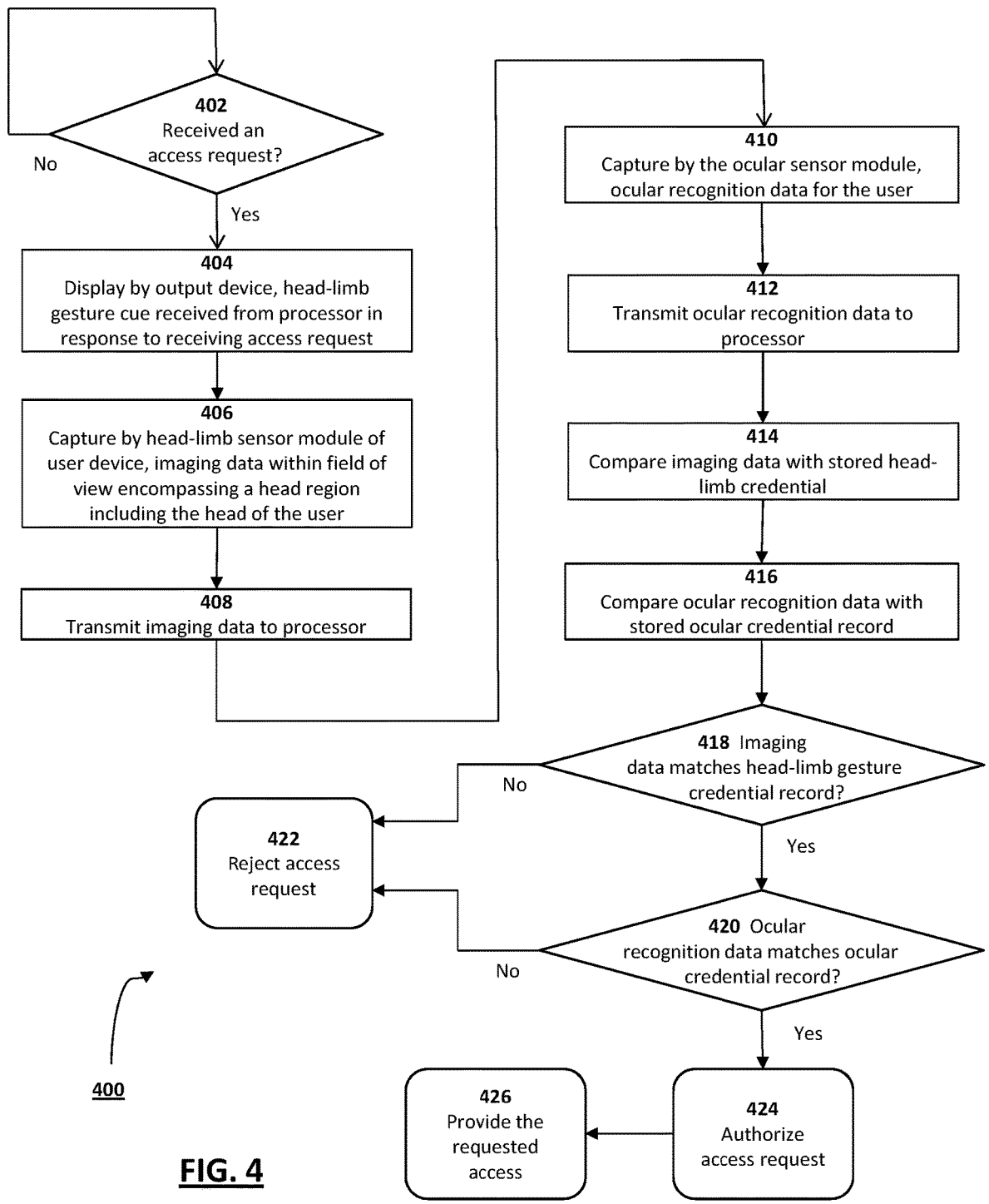
FIG. 4 is a flowchart of an exemplary access control method for authenticating user access to a user device, according to an exemplary embodiment.

FIG. 4 is a flowchart showing another process 400 for authenticating a user accessing an operating environment of a user device using a combination of biometric authentication and gesture authentication, according to an exemplary embodiment. In the event the process 400 authenticates the user as authorized to access the user device, the process provides requested access to the operating environment of the user device, or to one or more resources within that operating environment. The process 400, like processes 200 and 300, includes an authentication factor based upon head-limb gesture recognition. Additionally, process 400 includes additional a second authentication factor for user authentication involving analysis of ocular recognition data for the user captured by an ocular sensor module. In the following discussion, limited information is provided as to steps relating to the first authentication factor involving head-limb gesture recognition data. Additional details are described for corresponding steps of the process 200 of FIG. 2.

At step 404, an output device of the user device displays a head-limb gesture cue in in response to receiving an access request at step 402. The output device of the user terminal may be a visual output device such as a display screen, an audio output device such as a speaker, or a device that provides both audio and visual outputs.

The head-limb gesture cue displayed at step 404 serves to alert the user to the need to make a head-limb gesture. Additionally, the head-limb gesture cue may provide the user with information on what head-limb gesture should be made. In an embodiment, the head-limb gesture cue may provide instructions on when the head-limb gesture should start, and information on the duration of capture of second imaging data of the user by the head-limb sensor module. Additional aspects and embodiments of step 404 are discussed above with reference to the corresponding step 208 of process 200.

At step 406, a head-limb sensor module of the user device captures second imaging data, wherein the head-limb sensor module is in operative communication with the processor. In an embodiment, the head-limb sensor module captures the second imaging data within a field of view that encompasses a head region including the head of the user. Additional aspects and embodiments of step 406 are discussed above with reference to the corresponding step 210 of process 200.

At step 408 the head-limb sensor module transmits imaging data to the processor.

At step 410, an ocular sensor module of the user device, also herein called an eye-tracking module, captures ocular recognition data for the user, also herein called eye-tracking data. The ocular sensor module is in operative communication with the processor.

In an embodiment of step 410, the ocular sensor module is configured to determine the direction of gaze of the user, via a static sensor measurement. A vector between a pupil center and corneal reflections can be used to compute a gaze direction. In an embodiment, ocular sensor module determines a point of regard of the user.

In another embodiment of step 410, the ocular sensor module is configured to determine eye movement of a user, via dynamic sensor measurements. In an embodiment, the ocular sensor module determines eye rotation from a change in light reflection from the eye. Eye movement may be based upon a saccade and/or a fixation, which may alternate. A fixation is generally maintaining a visual gaze on a single location, and can be a point between any two saccades. A saccade is generally a simultaneous movement of both eyes between two phases of fixation in the same direction.

In another embodiment of step 410, an ocular sensor module including a camera tracks eye image features (such as retinal blood vessels) and follows the features as the eye rotates.

In an embodiment of step 410, the user performs a direction of gaze or eye movement known only to the user. In this embodiment, the ocular recognition data represents an authentication factor involving secret knowledge of an authorized user.

In an embodiment, prior to step 410, the output device displays an ocular cue to the user. The ocular cue may serve to alert the user to the need to undertake a predetermined direction of gaze or given eye movement that serves as one authentication factor. Additionally, an ocular cue may provide the user with information on a direction of gaze, or eye movement, to be performed. In an example, the output device displays to the user a gesture cue to view a given point on a display screen. In an example, the output device displays a gesture cue to direct the user's gaze within the given area of the display screen. In another example, the output device displays a gesture cue first to view a first point on one side of the display screen, and then to view a second point at an opposite side of the display screen. In a further example, the output device displays to the user a gesture cue to perform a secret direction of gaze or secret eye movement, known only to the user.

At step 412, the ocular sensor module transmits the ocular recognition data to the processor.

At step 414, the processor compares the imaging data with one or more head-limb gesture credential records stored for one or more authorized user of the user device. In an embodiment, head-limb gesture recognition processes of step 414 can be carried out in parallel with ocular data capture procedures associated with a second factor of authentication method 400 at steps 410 and 412. Additional aspects and embodiments of step 414 are discussed above with reference to the corresponding step 216 of process 200.

At step 416, the processor compares the ocular recognition data with one or more ocular credential records stored for one or more authorized user of the user device. In an embodiment of step 416, an ocular credential record may be representative of a given direction of gaze, or given point of regard, of the user. In another embodiment, an ocular credential record may be representative of a given eye movement of the user. When employing a user device including a visual display such as a display screen, the ocular credential record may be associated with a given point of the visual display; a given area of the visual display; given content on the visual display; or eye movement involving multiple locations within the visual display.

In an embodiment, the ocular credential record may be representative of a direction of gaze and/or eye movement known only to the user, i.e., secret authentication factor. Various analogous aspects of a secret authentication factor are discussed above as to secret head-limb gesture authentication, in the discussion of step 208 of FIG. 2.

Steps 418 and 420 implement a two-factor authentication process that includes head-limb gesture recognition as a first authentication factor and ocular recognition as a second authentication factor, requiring success of both factors in order to authenticate the user. If the system does not match the imaging data with a head-limb gesture credential record of an authorized user at 418, the method rejects the access request 422. If the system successfully matches the head-limb gesture credential record of an authorized user at 418, but the comparison step 420 does not match the ocular recognition data with an ocular credential record of an authorized user at 420, the method rejects the access request 422. If the system successfully matches both authentication factors at 418, 420, the method authorizes the access request at 424.

Upon authorization of the user transaction for processing at 424, the user terminal provides the requested access to the user device at 426. The requested access may be access to the operating environment of the user device in an access request generated as part of a power-up routine of the user device. Alternatively, the user device may provide access requested by the user to one or more resources within the operating environment of the user device. In an embodiment, at 426 the user device provides access to one or more of a system setting, an application program, a data, and a hardware resource in the operating environment of the user device. In an embodiment, at 426 the user device provides access to data including one or more of an internet resource, a text file, an image file, an audio file, and a video file.

Figure 9:
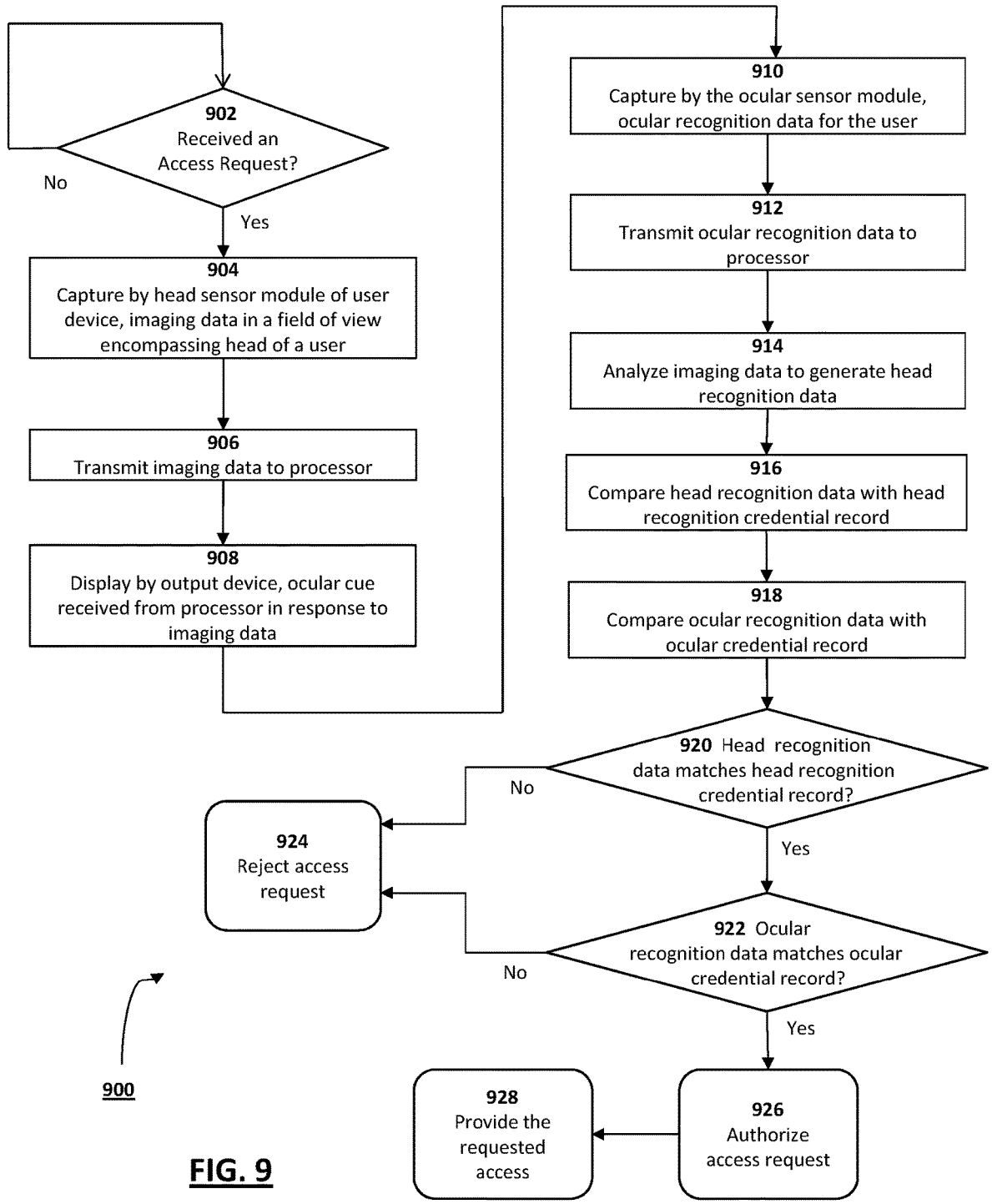
FIG. 9 is a flowchart of an exemplary access control method for authenticating user access to a user device, according to an exemplary embodiment.

FIG. 9 is a flowchart showing another process 900 for authenticating a user accessing an operating environment of a user device using biometric authentication based upon captured head imaging data, according to an exemplary embodiment. In the event the process 900 authenticates the user as authorized to access the user device, the process provides requested access to the operating environment of the user device, or to one or more resources within that operating environment. Process 900 implements two-factor authentication via head recognition and ocular recognition, but unlike processes 200, 300, and 400 does not include a head-limb authentication factor. In addition to the following discussion, reference should be had to the discussion of corresponding steps of process 200 for further details of authentication via head recognition, and reference should be had to the discussion of corresponding steps of process 400 for further details of authentication via ocular recognition.

In a first step 902, a processor (such as processor 102) in operative communication with the user detects an access request, such as by receiving an access request for access to an operating environment of the user device generated by a start-up routine of the user device setting on power-up, or by detecting a user input indicating a request for access to one or more resources within the operating environment of the user device. As step 904, in response to receiving the access request a head sensor module of the user device captures imaging data, wherein the head sensor module is in operative communication with the processor. In an embodiment, the head sensor module captures the imaging data within a field of view encompassing the head of a user of the user device. Additional aspects and embodiments of step 904 are discussed with reference to step 204.

At step 908, the output device displays an ocular cue to the user. The ocular cue may alert the user to the need to undertake a predetermined direction of gaze or given eye movement that serves as one authentication factor. Additionally, an ocular cue may provide the user with information on a direction of gaze, or eye movement, to be performed. In an example, the output device displays to the user an ocular cue to view a given point on a display screen. In an example, the output device displays an ocular cue to direct the user's gaze within the given area of the display screen. In another example, the output device displays an ocular cue first to view a first point on one side of the display screen, and then to view a second point at an opposite side of the display screen. In a further example, the output device displays to the user an ocular cue to perform a secret direction of gaze or secret eye movement, known only to the user.

In an embodiment of process 900, the ocular cue is combined with a head recognition cue in a combined head-ocular cue, examples of which are discussed with reference to FIGS. 11-12. In this embodiment, step 908 of displaying an ocular cue, also including displaying a head recognition cue as part of a combined head-ocular cue, is effected before the step 904 of capturing imaging data via the head sensor module. In this embodiment, the head-ocular cue may instruct the user to execute a head gesture and an ocular gesture simultaneously, during a common capture time period for the head sensor module and the ocular sensor module.

At step 910, the ocular sensor module captures head recognition data for the user. In one embodiment, the step of capturing ocular recognition data is effected after completion of step 904, capture of imaging data by the head sensor module. In another embodiment, the step of capturing ocular recognition data may be effected simultaneously with step 904, or at least these two capture steps are effected during a common capture time period. The latter arrangement is especially advantageous when an ocular gesture to be executed by an authorized user is aligned with a head gesture to be executed by an authorized user. An example is a head position gesture to face a given partition of a visual display, to be effected simultaneously with a direction of gaze at a point of regard within the given partition. Another example is a head movement gesture from a head position facing a first location to a head position facing a second partition, to be executed simultaneously with an eye movement from a direction of gaze at the first location to a direction of gaze at the second location.

At step 912, the ocular sensor module transmits ocular recognition data to the processor. In one embodiment, this step is effected after the steps 904 and 906 for capture and transmission of imaging data. In another embodiment in which capture steps 904 and 910 are effected simultaneously, step 912 is effected simultaneously as transmission step 906.

Steps 914 and 916 may be generally similar to corresponding steps 214 and 216 of FIG. 2. Step 918 may be generally similar to corresponding step 416 of FIG. 4. In embodiments in which the ocular recognition data is captured after capture of the imaging data, the head recognition credential record and the ocular credential record may be independent. For example, the ocular credential record may correspond to a direction of gaze in an entirely different direction than a head position corresponding to the head recognition credential record. In these embodiments, the ocular cue may instruct the user accordingly.

On the other hand, in embodiments in which the head recognition gesture and the ocular gesture required for authorization are simultaneous and aligned, the comparison steps 914 and 916 may be coordinated appropriately. For example in comparisons with a head recognition credential record and an ocular credential record corresponding to the use case illustrated in FIG. 11, the system may confirm that a point of regard indicated by ocular credential record is aligned with a head position indicated by the head recognition credential record.

Steps 920 and 922 implement a two-factor authentication process that includes head recognition as a first authentication factor and ocular recognition as a second authentication factor, requiring success of both factors in order to authenticate the user. If the system does not match the head recognition data with a head recognition credential record of an authorized user at 920, the method rejects the access request 924. If the system successfully matches the head recognition credential record of an authorized user at 920, but the comparison step 918 does not match the ocular recognition data with an ocular credential record of an authorized user at 922, the method rejects the access request 924. If the system successfully matches both authentication factors at 920, 922, the method authorizes the access request at 926.

Upon authorization of the user transaction for processing at 926, the user terminal provides the requested access to the user device at 928. The requested access may be access to the operating environment of the user device in an access request generated as part of a power-up routine of the user device. Alternatively, the user device may provide access requested by the user to one or more resources within the operating environment of the user device. In an embodiment, at 928 the user device provides access to one or more of a system setting, an application program, a data, and a hardware resource in the operating environment of the user device. In an embodiment, at 928 the user device provides access to data including one or more of an internet resource, a text file, an image file, an audio file, and a video file.

Figure 10:
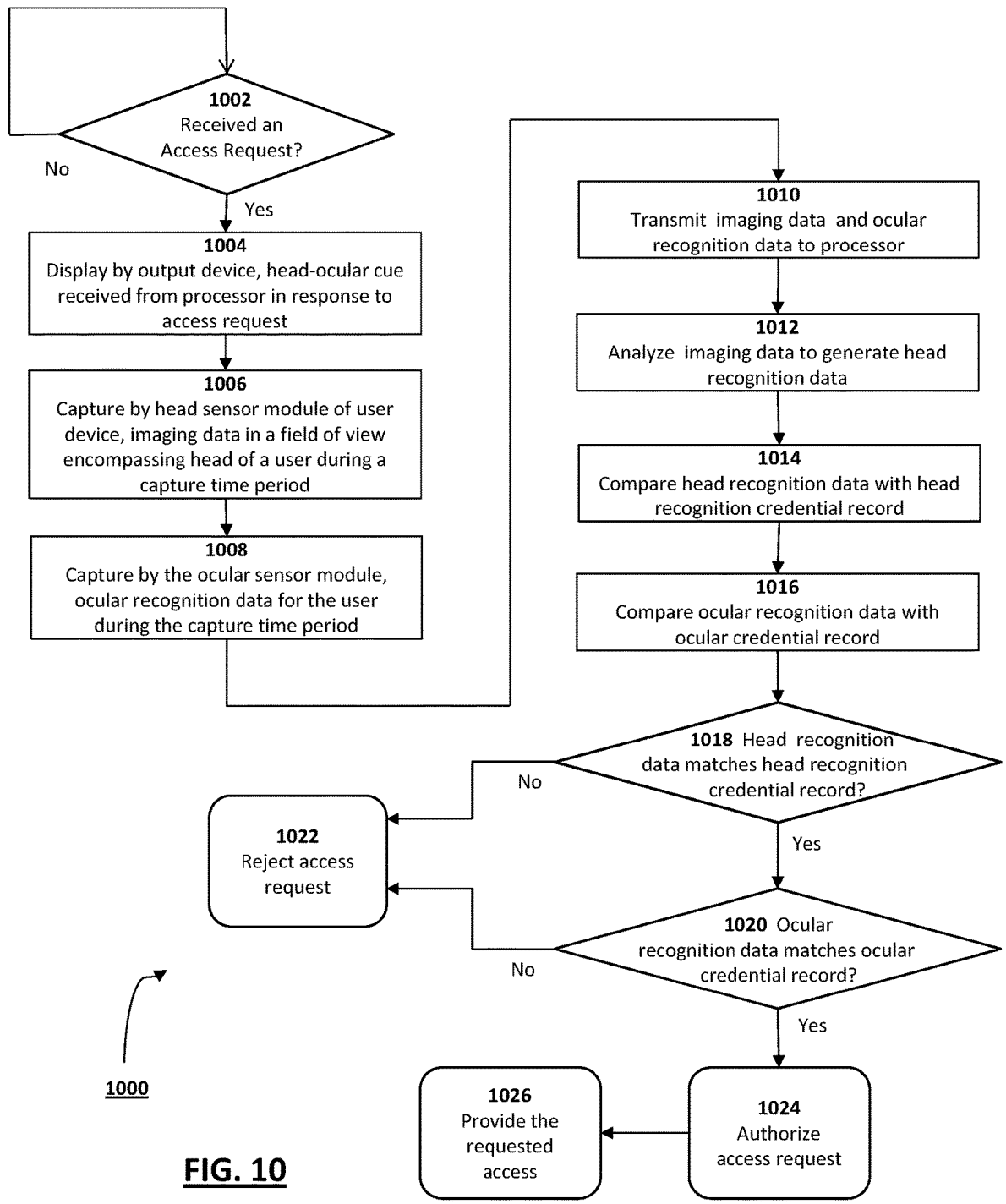
FIG. 10 is a flowchart of an exemplary access control method for authenticating user access to a user device, according to an exemplary embodiment.

FIG. 10 is a flowchart showing another process 1000 for authenticating a user accessing an operating environment of a user device using biometric authentication based upon captured head imaging data, according to an exemplary embodiment. In the event the process 1000 authenticates the user as authorized to access the user device, the process provides requested access to the operating environment of the user device, or to one or more resources within that operating environment. Like process 900, process 1000 implements two-factor authentication via head recognition and ocular recognition in a process that does not include a head-limb authentication factor. Process 1000 implements simultaneous capture of imaging data by a head sensor module and capture of ocular recognition data by the ocular recognition module. In addition to the following discussion, reference should be had to the discussion of corresponding steps of process 200 for further details of authentication via head recognition, and reference should be had to the discussion of corresponding steps of process 400 for further details of authentication via ocular recognition.

At step 1004, following receipt by the processor of an access request, the output device displays a head-ocular cue received from the processor. In an embodiment, the head-ocular cue may instruct the user to execute a head gesture and an ocular gesture simultaneously, during a common capture time period for the head sensor module and the ocular sensor module. In an embodiment, the head-ocular cue may instruct the user to execute an optical gesture that is aligned with a head gesture.

In an embodiment of step 1004, the head-ocular cue provides secret instructions to execute a predetermined head position or a predetermined head movement, and simultaneously to execute a predetermined gaze direction or a predetermined eye movement. In an embodiment, the predetermined head position or the predetermined head movement is aligned with the predetermined gaze direction or the predetermined eye movement.

In an embodiment of step 1004, the head-ocular cue provides secret instructions to execute a predetermined head position and simultaneously to execute a predetermined gaze direction. In another embodiment, the head-ocular cue provides secret instructions to execute a predetermined head movement and simultaneously to execute a predetermined eye movement.

Examples of head-ocular cues in accordance with step 1004 are discussed with reference to FIGS. 11-12. In an embodiment, the output device of the user device provides a visual display including a plurality of partitions. The head-ocular cue provides secret instructions to position the user's head to face a given partition of the plurality of partitions, and simultaneously to direct the user's gaze to a point of regard within the partition faced by the user. In another embodiment, the output device of the user device provides a visual display including a first location and a second location. The head-ocular cue provides secret instructions to execute a head movement from facing the first location to facing the second location, and simultaneously to execute an eye movement from a first point of regard at the first location to a second point of regard at the second location.

Steps 1006 and 1008 implement capture of imaging data by the head sensor module and capture of ocular recognition data by the ocular sensor module during a common capture time period. Additional aspects and embodiments of steps 1006 and 1008 are discussed above with reference to step 910 of FIG. 9, and with respect to corresponding step 204 of FIG. 2 and step 410 of FIG. 4.

Steps 1012, 1014, and 1016 may be similar to corresponding steps of FIG. 9. In some embodiments, the comparison steps 1014 and 1016 may be coordinated as appropriate to any alignment of the head recognition credential record and the ocular credential record. For example in comparisons with a head recognition credential record and an ocular credential record corresponding to the use case illustrated in FIG. 11, the system may confirm that a point of regard indicated by ocular credential record is aligned with a head position indicated by the head recognition credential record.

Steps 1018 and 1010 implement a two-factor authentication process that includes head recognition as a first authentication factor and ocular recognition as a second authentication factor, requiring success of both factors in order to authenticate the user. If the system does not match the head recognition data with a head recognition credential record of an authorized user at 1018, the method rejects the access request 1022. If the system successfully matches the head recognition credential record of an authorized user at 1018, but the comparison step 1016 does not match the ocular recognition data with an ocular credential record of an authorized user at 1020, the method rejects the access request 1022. If the system successfully matches both authentication factors at 1018, 1020, the method authorizes the access request at 1024.

Upon authorization of the user transaction for processing at 1024, the user terminal provides the requested access to the user device at 1026. The requested access may be access to the operating environment of the user device in an access request generated as part of a power-up routine of the user device. Alternatively, the user device may provide access requested by the user to one or more resources within the operating environment of the user device. In an embodiment, at 1026 the user device provides access to one or more of a system setting, an application program, a data, and a hardware resource in the operating environment of the user device. In an embodiment, at 1026 the user device provides access to data including one or more of an internet resource, a text file, an image file, an audio file, and a video file.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A processor-based method, comprising:
receiving, by a processor in operative communication with a user device, an access request, wherein the access request comprises a requested access to the user device;
displaying a visual display including a plurality of partitions, wherein the visual display includes a head recognition cue received from the processor in response to the receiving the access request, the head recognition cue including a secret instruction to position or move a head of the user to face a given partition of the plurality of partitions, wherein the secret instruction to position or move the head of the user is not apparent from the head recognition cue and depends on a knowledge authentication factor known by the authorized user;
capturing, by a head sensor module of the user device in response to the receiving the access request, imaging data within a field of view encompassing the head of a user of the user device, wherein the head sensor module is in operative communication with the processor;
transmitting, by the user device, the imaging data to the processor;
displaying, by an output device of the user device in operative communication with the processor, the visual display including the plurality of partitions and a respective point of regard within each of the plurality of partitions, wherein the visual display includes an ocular cue received from the processor in response to the imaging data, the ocular cue including a secret instruction to direct the gaze of the user of the user device to the respective point of regard within the given partition of the plurality of partitions, wherein the secret instruction to direct the gaze of the user is not apparent from the ocular cue and depends on a knowledge authentication factor known by an authorized user;

capturing, by an ocular sensor module of the user device in communication with the processor, ocular recognition data for the user, following the displaying the ocular cue;

transmitting, by the user device, the ocular recognition data to the processor;

comparing, by the processor, the imaging data with a head recognition credential record stored by the processor, wherein the imaging data matches the head recognition credential record stored by the processor in the event the head recognition data is representative of the position or the movement of the head of the user to face the given partition of the plurality of partitions;

comparing, by the processor, the ocular recognition data with an ocular credential record stored by the processor, wherein the ocular recognition data matches the ocular credential record stored by the processor if the ocular recognition data is representative of a sensed point of regard matching the respective point of regard included in the secret instruction to direct the gaze of the user of the user device; and in the event the imaging data matches the head recognition credential record stored by the processor and the ocular recognition data matches the ocular credential record stored by the processor,
authorizing, by the processor, the access request; and
providing, by the user device, the requested access to the user device.

2. The method of claim 1, wherein the ocular cue instructs the user to execute a predetermined eye movement directing the user's gaze to the respective point of regard within the given partition.

3. The method of claim 2, wherein the processor stores the ocular credential record in association with an identifier for the user.

4. The method of claim 1, wherein the head recognition data includes facial recognition data, further comprising the step of comparing the facial recognition data with a facial recognition credential record for the user stored by the processor wherein the authorizing step comprises authorizing the access request in the event the facial recognition data matches the facial recognition credential record for the user stored by the processor, and the ocular recognition data matches the ocular credential record stored by the processor.

5. The method of claim 1, wherein the access request comprises a requested access to an operating environment of the user device on power-up.

6. A processor-based method, comprising:
receiving, by a processor in operative communication with a user device, an access request, wherein the access request comprises a requested access to an operating environment of the user device on power-up;
displaying, by an output device of the user device in operative communication with the processor in response to the receiving the access request, a visual display including a plurality of partitions and a respective point of regard within each of the plurality of partitions, wherein the visual display includes a head recognition cue and an ocular cue received from the processor, the head recognition cue including an instruction to position or move a head of a user of the user device to face a given partition of the plurality of partitions, the ocular cue including an instruction directing the user's gaze to the respective point of regard within the given partition;
capturing, by a head sensor module of the user device, imaging data within a field of view encompassing the head of the user, wherein the head sensor module is in operative communication with the processor;
transmitting, by the user device, the imaging data to the processor;
capturing, by an ocular sensor module of the user device in communication with the processor, ocular recognition data for the user;
transmitting, by the user device, the ocular recognition data to the processor;
comparing, by the processor, the imaging data with a head recognition credential record stored by the processor, wherein the imaging data matches the head recognition credential record stored by the processor in the event the imaging data is representative of the position or movement of the head of the user to face the given partition of the plurality of partitions;
comparing, by the processor, the ocular recognition data with an ocular credential record stored by the processor, wherein the ocular recognition data matches the ocular credential record stored by the processor if the ocular recognition data is representative of a sensed point of regard matching the respective point of regard within the given partition included in the instruction directing the user's gaze; and
in the event the imaging data matches the head recognition credential record stored by the processor and the ocular recognition data matches the ocular credential record stored by the processor,
authorizing, by the processor, the access request; and
providing, by the user device, the requested access to the operating environment of the user device on power-up.

7. The method of claim 6, wherein the ocular cue includes a secret instruction directing the user's gaze to the respective point of regard within the given partition, wherein the instruction directing the user's gaze is not apparent from the ocular cue and depends on a knowledge authentication factor known by the authorized user.

8. The method of claim 7, wherein the ocular cue instructs the user to execute a predetermined eye movement directing the user's gaze to the respective point of regard within the given partition.

9. The method of claim 6, wherein the head recognition cue instructs the user to execute a predetermined movement of the head of the user to face the given partition.

10. The method of claim 6, wherein the head recognition cue is a head-ocular cue that instructs the user to execute a predetermined position of the head of the user to face the given partition or a predetermined movement of the head of the user to face the given partition, and simultaneously to execute a predetermined gaze direction or a predetermined eye movement directing the user's gaze to the respective point of regard within the given partition.

11. The method of claim 10, wherein the predetermined position of the head of the user or the predetermined movement of the head of the user is aligned with the predetermined gaze direction or the predetermined eye movement.

12. The method of claim 6, wherein the head recognition data further includes facial recognition data, further comprising the step of comparing the facial recognition data with a facial recognition credential record for the user stored by the processor wherein the authorizing step comprises authorizing the access request in the event the head recognition data is representative of the position or movement of the head of the user to face the given partition of the plurality of partitions, the facial recognition data matches the facial recognition credential record for the user, and the ocular recognition data matches the ocular credential record stored by the processor.

13. The method of claim 6, wherein the head recognition cue includes a secret instruction to position or move a head of a user of the user device to face the given partition of the plurality of partitions, wherein the instruction to position or move the head of the user is not apparent from the head recognition cue and depends on a knowledge authentication factor known by an authorized user.

14. A system, comprising:
a head sensor module of a user device for capturing imaging data within a field of view encompassing a head of a user of the user device, wherein the head sensor module is in operative communication with a processor;
an ocular sensor module of the user device for capturing ocular recognition data of the user, wherein the ocular sensor module is in operative communication with the processor;
an output device of the user device;
an authentication database hosted by the processor comprising non-transitory machine-readable memory, the authentication database configured to store a head recognition credential record and an ocular credential record; and
the processor, configured to execute an authentication module, wherein the processor in communication with the non-transitory machine-readable memory and the authentication module executes a set of instructions instructing the processor to:
receive an access request, wherein the access request comprises a requested access to the user device;
generate a visual display for display by the output device in response to the receiving the access request, wherein the visual display includes a plurality of partitions and a respective point of regard within each of the plurality of partitions, and further includes a head recognition cue including a instruction to position or move the head of the user of the user device to face a given partition of the plurality of partitions, wherein the secret instruction to position or move the head of the user is not apparent from the head recognition cue and depends on a knowledge authentication factor known by an authorized user;
receive from the head sensor module the imaging data within the field of view encompassing the head of the user of the user device;
generate a visual display for display by the output device including the plurality of partitions, wherein the visual display includes an ocular cue including a secret instruction directing the gaze of the user of the user device to a respective point of regard within the given partition of the plurality of partitions, wherein the secret instruction directing the gaze of the user is not apparent from the ocular cue and depends on a knowledge authentication factor known by the authorized user;
receive from the ocular sensor module the ocular recognition data of the user;
compare the imaging data with the head recognition credential record stored by the authentication database, wherein the imaging data matches the head recognition credential record in the event the imaging data is representative of the position or movement of the head of the user to face the given partition of the plurality of partitions;
compare the ocular recognition data with the ocular credential record stored by the authentication database, wherein the ocular recognition data matches the ocular credential record stored by the authentication database if the ocular recognition data is representative of a sensed point of regard matching the respective point of regard included in the secret instruction directing the gaze of the user of the user device; and
in the event the imaging data matches the head recognition credential record stored by the authentication database and the ocular recognition data matches the ocular credential record stored by the authentication database, authorize the access request and provide the requested access to the user device.

15. The system of claim 14, wherein the head recognition cue instructs the user to execute a predetermined position of the head of the user to face the given partition or a predetermined movement of the head of the user to face the given partition.

16. The system of claim 14, wherein the head recognition cue is a head-ocular cue that instructs the user to execute a predetermined head position or a predetermined head movement, and simultaneously to execute a predetermined gaze direction or a predetermined eye movement, prior to the processor receiving from the head sensor module the imaging data within the field of view encompassing the head of the user.

17. The system of claim 16, wherein the predetermined head position or the predetermined head movement is aligned with the predetermined gaze direction or the predetermined eye movement.

18. The system of claim 14, wherein the access request comprises a requested access to an operating environment of the user device on power-up.

* * * * *